United States Patent
Kaino et al.

(10) Patent No.: US 12,381,713 B2
(45) Date of Patent: Aug. 5, 2025

(54) ENCRYPTION COMMUNICATION SYSTEM, ENCRYPTION COMMUNICATION APPARATUS, AND ENCRYPTION COMMUNICATION

(71) Applicants: KABUSHIKI KAISHA TOSHIBA, Tokyo (JP); TOSHIBA DIGITAL SOLUTIONS CORPORATION, Kawasaki (JP)

(72) Inventors: Kazuhisa Kaino, Tokyo (JP); Masakatsu Matsuo, Tokyo (JP); Manabu Kobayashi, Tokyo (JP); Koki Ando, Tokyo (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 118 days.

(21) Appl. No.: 18/445,066

(22) Filed: Mar. 29, 2023

(65) Prior Publication Data
US 2023/0388105 A1   Nov. 30, 2023

(30) Foreign Application Priority Data
Mar. 29, 2022 (JP) ................. 2022-052828

(51) Int. Cl.
*H04L 9/40* (2022.01)
*H04L 9/08* (2006.01)
(Continued)

(52) U.S. Cl.
CPC .......... *H04L 9/0816* (2013.01); *H04L 9/0861* (2013.01); *H04L 41/0803* (2013.01); *H04L 45/02* (2013.01)

(58) Field of Classification Search
CPC .. H04L 9/0816; H04L 9/0861; H04L 41/0803
See application file for complete search history.

(56) References Cited

U.S. PATENT DOCUMENTS

2008/0137857 A1* 6/2008 Bellare ............... H04L 9/0894
                                                  708/250
2014/0229386 A1* 8/2014 Tervo ................. G06F 21/62
                                                  705/71
(Continued)

FOREIGN PATENT DOCUMENTS

CN   108449175 A   8/2018
JP   5672425 B2   2/2015
(Continued)

OTHER PUBLICATIONS

Heling Xiao et al., "Quantum Ramp Secret Sharing Scheme and Quantum Operations," Int'l J. Theor. Phys., vol. 55, No. 9, pp. 3807-3815, DOI: 10.1007/S10773-016-3010-2 (2016).
(Continued)

*Primary Examiner* — Thaddeus J Plecha
(74) *Attorney, Agent, or Firm* — Finnegan, Henderson, Farabow, Garrett & Dunner, LP

(57) ABSTRACT

According to one embodiment, an encryption communication system configures a network with a plurality of nodes, and shares the encryption key between a first node that delivers the encryption key to a first user and a second node that delivers the encryption key to a second user. The first node forms n (n>1) systems of paths to the second node over the network, generates n pieces of first data, distributes the n pieces of first data to the n systems of paths and transmits the n pieces of first data to the second node, and generates the encryption key by superimposing the n pieces of first data. The second node receives the n pieces of first data from the first node via the n systems of paths, and generates the encryption key by superimposing the n pieces of first data.

16 Claims, 15 Drawing Sheets

(51) Int. Cl.
*H04L 41/0803* (2022.01)
*H04L 45/02* (2022.01)

(56) References Cited

U.S. PATENT DOCUMENTS

| | | |
|---|---|---|
| 2017/0093811 A1 | 3/2017 | Dolev et al. |
| 2019/0379463 A1 | 12/2019 | Shields et al. |
| 2021/0182863 A1* | 6/2021 | Doraiswamy .......... G06Q 20/02 |
| 2021/0328974 A1* | 10/2021 | Grooters ............... H04L 9/0643 |
| 2022/0173894 A1* | 6/2022 | Cain, Jr. .................... H04L 9/14 |

FOREIGN PATENT DOCUMENTS

| | | |
|---|---|---|
| JP | 5685735 B2 | 3/2015 |
| JP | 2018-502514 A | 1/2018 |
| JP | 6783772 B2 | 11/2020 |
| WO | WO 2012/133952 A1 | 10/2012 |
| WO | WO 2016/112086 A1 | 7/2016 |

OTHER PUBLICATIONS

Japan Patent Office, Office Action in JP App. No. 2022-052828, 5 pages, and machine translation, 5 pages (Jan. 7, 2025).

Mori et al., "The Study of Common-key Secret Sharing Method in Ad-hoc Networks", IPSJ SIG Technical Report (vol. 2009, No. 8 (MBL-48)), 2009, pp. 25-32.

Tomita et al., "Frontier of Quantum Cryptography", The Journal of the Institute of Electronics, Information and Communication Engineers (vol. 102, No. 10), 2019, pp. 942-946.

* cited by examiner

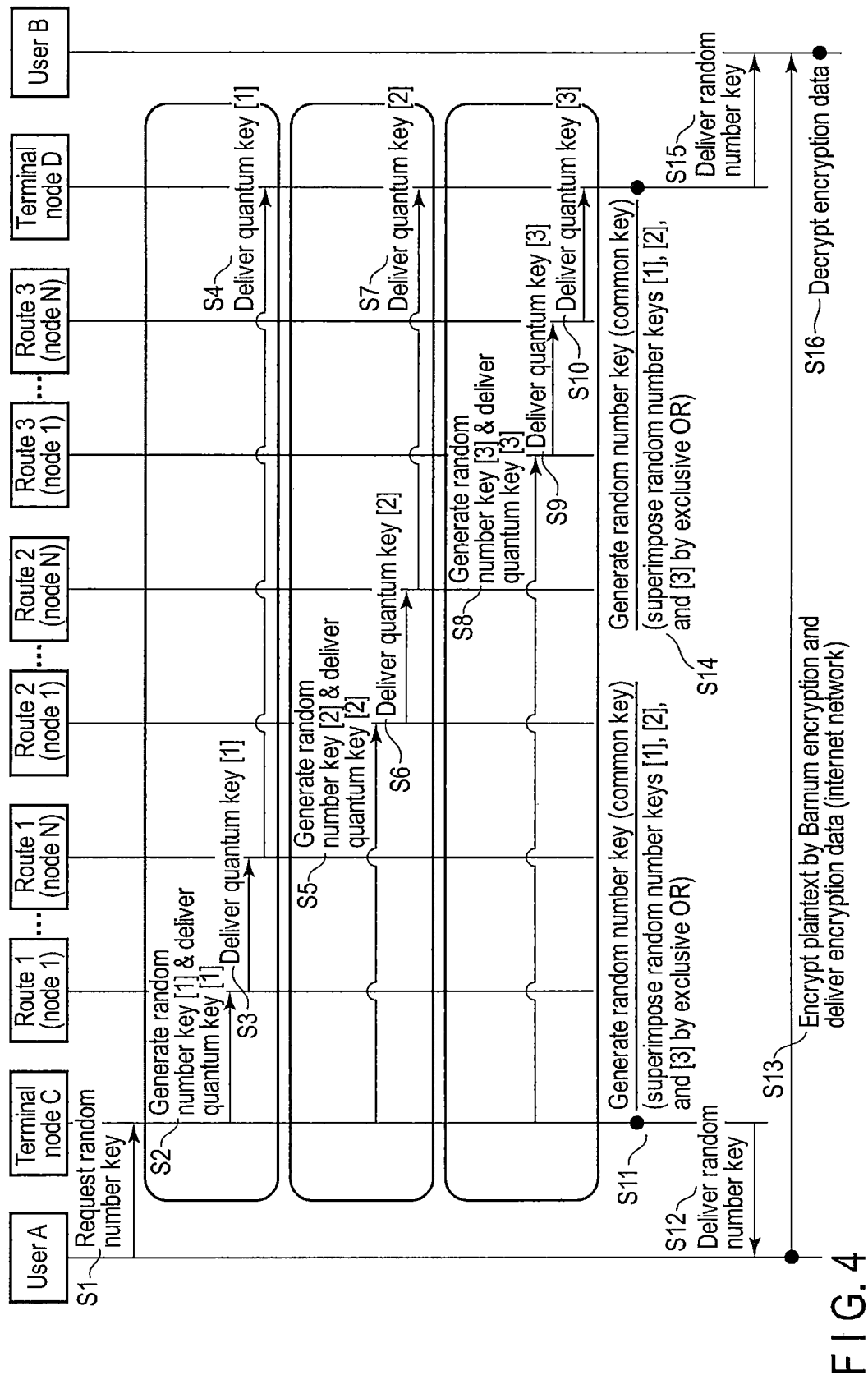
F I G. 4

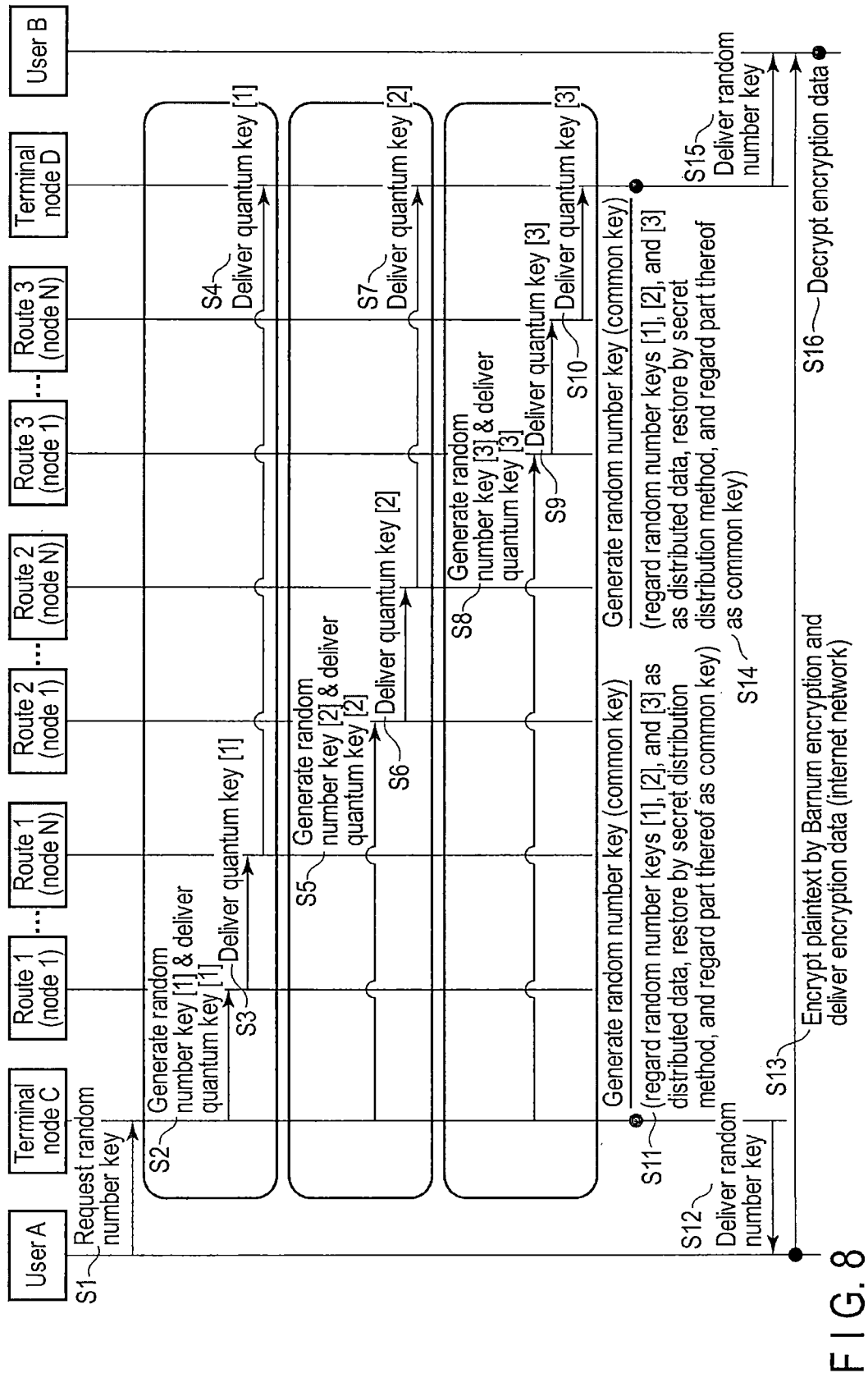
F I G. 8

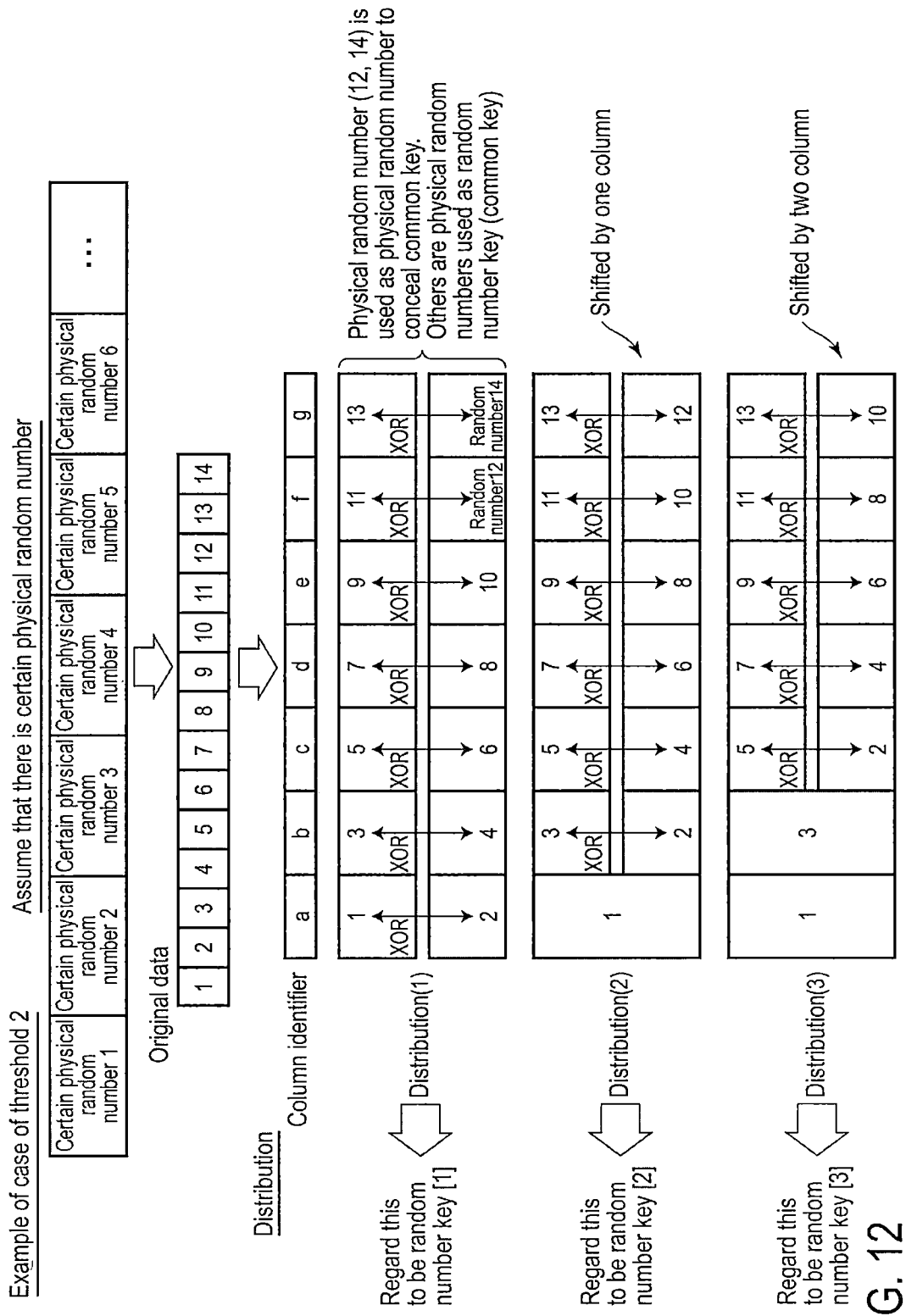
F I G. 12

Example of case of threshold 2

Restoration

| Column identifier | a | b | c | d | e | f | g |
|---|---|---|---|---|---|---|---|
| Distribution (A) | 1 XOR→ ←2 | 3 XOR→ ←4 | 5 XOR→ ←6 | 7 XOR→ ←8 | 9 XOR→ ←10 | 11 XOR→ ←12 | 13 XOR→ ←14 |
| Distribution (C) | 2 | ←1 XOR→ 4 | →3 XOR← 6 | →5 XOR← 8 | →7 XOR← 10 | →9 XOR← 12 | →11 XOR← 14 |

- No inconsistency occurs in restoration with threshold 2 and variance number 2
- Although there is inconsistency with threshold 2 and variance number $2 + \alpha$ ($\alpha = 1, 2, 3, \ldots$), similarly to threshold 3, it is regarded that there is another random number shared in advance in distributed data that causes inconsistency Calculation
- [Distribution(C)a] XOR → Column acquire 2
- [Distribution(A)a] XOR Column 2 → Column acquire 1
- [Distribution(C)b] XOR Column 1 → Column acquire 4
- [Distribution(A)b] XOR Column 4 → Column acquire 3
- [Distribution(C)c] XOR Column 3 → Column acquire 6
- [Distribution(A)c] XOR Column 6 → Column acquire 5
- [Distribution(C)d] XOR Column 5 → Column acquire 8
- [Distribution(A)d] XOR Column 8 → Column acquire 7
- [Distribution(C)e] XOR Column 7 → Column acquire 10
- [Distribution(A)e] XOR Column 10 → Column acquire 9
- [Distribution(C)f] XOR Column 9 → Column acquire 12
- [Distribution(A)f] XOR Column 12 → Column acquire 11
- [Distribution(C)g] XOR Column 11 → Column acquire 14
- [Distribution(A)g] XOR Column 14 → Column acquire 13

Original data | 1 | 2 | 3 | 4 | 5 | 6 | 7 | 8 | 9 | 10 | 11 | 12 | 13 | 14 |

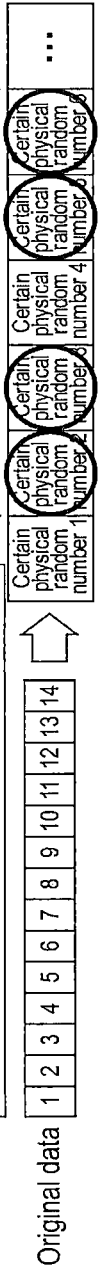

Random number key (common key): Certain physical random number 1, Certain physical random number 2, Certain physical random number 3, Certain physical random number 4, Certain physical random number 5, ...

F I G. 13

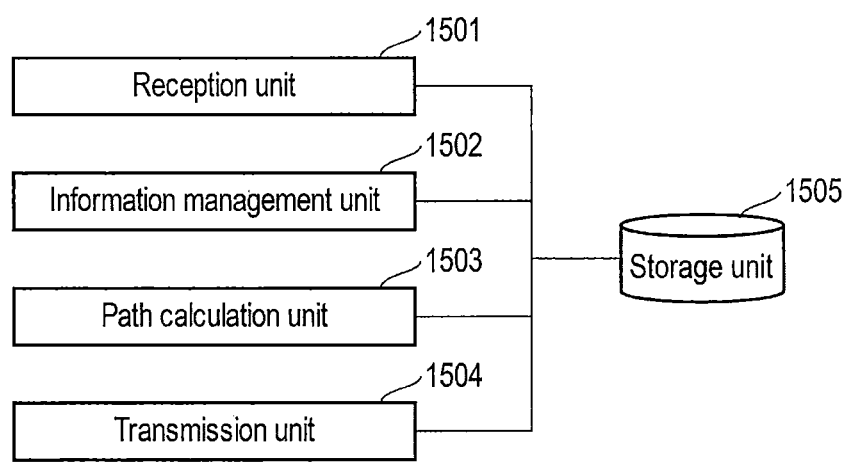
F I G. 15

ENCRYPTION COMMUNICATION SYSTEM, ENCRYPTION COMMUNICATION APPARATUS, AND ENCRYPTION COMMUNICATION

CROSS-REFERENCE TO RELATED APPLICATIONS

This application is based upon and claims the benefit of priority from Japanese Patent Application No. 2022-052828, filed Mar. 29, 2022, the entire contents of which are incorporated herein by reference.

FIELD

Embodiments described herein relate generally to an encryption communication system, an encryption communication apparatus, and an encryption communication method.

BACKGROUND

There is a quantum encryption communication system that suppresses deterioration in security of encryption communication against deterioration in reliability of an intermediate node for extending a communication distance by changing a communication unit or a transmission unit of an encryption key (common key). For example, there is a technique of multiplexing and encrypting encryption communication from a transmission source node to a transmission destination node with an independent encryption key (common key) shared by two or more paths from the transmission source node to the transmission destination node via the intermediate node.

In addition, there is a technique in which one encryption key (common key) is divided into a plurality of pieces, shared by two or more paths passing through an intermediate node from a transmission source node to a transmission destination node, and the encryption key (common key) is combined and decrypted in the transmission destination node.

A technique in which data desired to be concealed is distributed and transmitted to a plurality of fragments so that information is not leaked from the distributed data is referred to as a secret distribution method. A (k, n) threshold secret distribution method, which is one of secret distribution methods, has a feature that data desired to be concealed is distributed into n pieces, and any k pieces of the data can be collected to restore original data, but even when k−1 pieces are collected, information included in the original data cannot be restored at all. The (k, n) threshold secret distribution method is also referred to as a perfect secret distribution method.

In addition, there is a ramp-type secret distribution method as a method of improving transmission efficiency while sacrificing data concealment as compared with the perfect secret distribution method. For example, there is a technique of obfuscating distributed data by combining random number data with distributed data and performing an exclusive OR.

However, in these techniques, there are a problem of failure tolerance in which an intermediate node in a multiplexed path can be a single point of failure, and a problem that when a part of a plaintext encryption key is stolen by an unauthorized eavesdropper, a part of communication content is decrypted, and security of communication is not maintained.

In addition, a transfer distance becomes about half by nesting the intermediate nodes, and there is a problem that introduction and operation costs in social implementation increase.

BRIEF DESCRIPTION OF THE DRAWINGS

FIG. 4 is a sequence chart representing a processing procedure of an encryption communication method executed by the encryption communication system of the first embodiment.

FIG. 8 is a sequence chart representing a processing procedure of an encryption communication method executed by the encryption communication system of the second embodiment.

FIG. 12 is a first diagram illustrating an example of a method of generating a random number key by the ramp-type secret distribution with a distribution number 3 and a threshold 2 in the encryption communication system of the second embodiment.

FIG. 13 is a second diagram illustrating an example of a method of generating a random number key by the ramp-type secret distribution with a distribution number 3 and a threshold 2 in the encryption communication system of the second embodiment.

FIG. 15 is a block diagram illustrating an example of a configuration of a path management server of the encryption communication system of the first embodiment or the second embodiment.

DETAILED DESCRIPTION

In general, according to one embodiment, an encryption communication system delivers an encryption key to a first user and a second user who execute encryption communication. The encryption communication system configures a network with a plurality of nodes, and shares the encryption key between a first node that delivers the encryption key to the first user and a second node that delivers the encryption key to the second user among the plurality of nodes. The first node is configured to form n (n>1) systems of paths to the second node over the network, generate n pieces of first data, distribute the n pieces of first data to the n systems of paths and transmit the n pieces of first data to the second node, and generate the encryption key by superimposing the n pieces of first data. The second node is configured to receive the n pieces of first data from the first node via the n systems of paths, and generate the encryption key by superimposing the n pieces of first data.

Hereinafter, embodiments will be described with reference to the drawings.

First Embodiment

First, a first embodiment will be described.

In the encryption communication system of the first embodiment, between a transmission source node and a transmission destination node, data necessary for generating an encryption key (hereinafter, the encryption key used in the Internet network is described as a random number key) using superposition of, for example, Barnum encryption is distributed to a plurality of systems of paths (routes) and transmitted and received, and a random number key (common key) is shared. The encryption communication system of the first embodiment delivers a shared encryption key from the two nodes to a user who executes encryption communication.

As a result, even when an unauthorized eavesdropper intrudes into an intermediate node on a certain route and steals a part of data necessary for generating a random number key, the unauthorized eavesdropper cannot decrypt the random number key, thereby maintaining the security of communication of the user.

Figure 1:
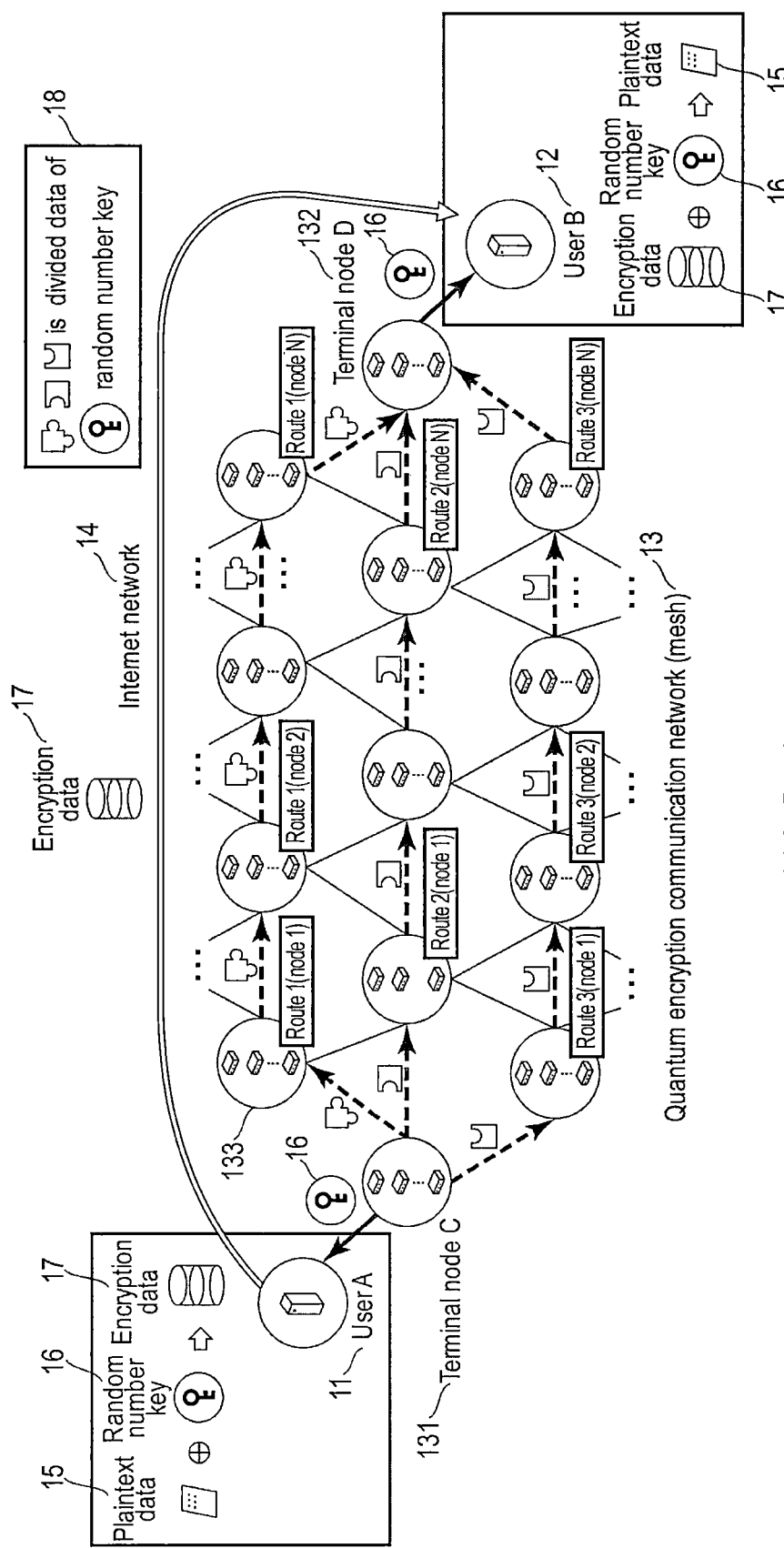
FIG. 1 is a block diagram illustrating an example of a configuration of an encryption communication system of a first embodiment.

FIG. 1 is a block diagram illustrating an example of a configuration of the encryption communication system of the first embodiment. The encryption communication system of the first embodiment delivers a random number key (encryption key) 16 for encryption communication via a quantum encryption communication network 13 to a user A11 (communication device of the user A11) and a user B12 (communication device of the user B12) that transmit and receive encryption data 17 via an Internet network 14. The user A11 encrypts plaintext data 15 by using the random number key 16 delivered from the encryption communication system, and transmits the encryption data 17 generated by the encryption to the user B12 via the Internet network 14. The user B12 decrypts the encryption data 17 received from the user A11 via the Internet network 14 by using the random number key 16 also delivered from the encryption communication system, and acquires the plaintext data 15. That is, the encryption communication system of the first embodiment is a platform that provides a service for delivering a random number key to a user who executes encryption communication.

As illustrated in FIG. 1, the encryption communication system of the first embodiment includes a quantum encryption communication network (mesh) 13. In the quantum encryption communication network 13, a plurality of nodes each having a quantum key delivery function are coupled in a mesh form. Note that the mesh-like coupling does not necessarily mean that all adjacent nodes are coupled. Some adjacent nodes may not be coupled to each other. The quantum key delivery is a technique that uses quantum behavior such as photons, and generates and shares an encryption key by transmitting and receiving encryption key information between nodes using photons using an optical fiber as a medium, for example. Note that the encryption key generated and shared by the quantum key delivery function between two adjacent nodes over the quantum encryption communication network 13 is not the random number key 16 to be delivered to the user, but is an encryption key for executing encryption communication (quantum encryption communication) between the two adjacent nodes. Note that the random number key 16 may be generated from a random number key generated and shared between a terminal node C131 and an adjacent node. For this encryption communication, for example, a one time pad encryption (OTP) that cannot be decrypted with only encryption data is used.

The plurality of nodes include the terminal node C131 coupled to the user A11, a terminal node D132 coupled to the user B12, and an intermediate node 133 interposed on a route formed between the terminal node C131 and the terminal node D132. Note that each node in the quantum encryption communication network 13 may be a terminal node that delivers the random number key 16 to the user, or may be an intermediate node that relays data (divided data 18 described later) necessary for generating the random number key 16.

When starting encryption communication with the user B12, the user A11 requests the terminal node C131 for the random number key 16. Note that the request for the random number key 16 of the user A11 may not be directly made to the terminal node C131. For example, the user A11 requests the random number key 16 from a server (not illustrated) that centrally manages a service for providing the random number key 16. The server that has received the request from the user A11 transmits the request to the terminal node C131 coupled to the user A11. The request for the random number key 16 to the server includes designation of a communication partner. Then, for example, the server instructs the terminal node D132 coupled to the user B12 that is the communication partner of the user A11 to share the random number key 16 with the terminal node C131 and deliver the shared random number key 16 to the user B12. Or conversely, the terminal node C131 is instructed to share the random number key 16 with the terminal node D132 and deliver the shared random number key 16 to the user B12.

Upon receiving the request for the random number key 16 from the user A11, the terminal node C131 generates a plurality of pieces of divided data 18 as data necessary for generating the random number key 16. Although described as divided data, it does not mean that the data of the random number key 16 is simply divided. The divided data 18 may be a random number having a same length as the random number key 16, for example. That is, in this case, when the data length of the random number key 16 is x, the generation of the plurality of pieces of divided data 18 means not generating n pieces of divided data 18 having a data length (x/n) by equally dividing the random number key 16 into n, but generating n pieces of divided data 18 having a same length (x) as the random number key 16, for example. Note that instead of generating the random number as the divided data 18, a quantum key generated by the quantum key delivery function may be diverted as the divided data 18.

Note that the delivery of the random number key 16 from the terminal node C131 to the user A11 may be continuously performed while the user A11 executes encryption communication via the Internet network. Therefore, the generation of the divided data 18 necessary for the generation of the random number key 16 is also continuously performed.

In addition, the terminal node C131 forms a plurality of routes for distributing and transferring the plurality of pieces of divided data 18 to another route with the terminal node D132. The terminal node C131 acquires, for example, information of a terminal node D132 from the above-described server. Details of the formation of the route over the quantum encryption communication network 13 will be described later. For example, the number of generated pieces of divided data 18 is the same as the number of formed routes.

The terminal node C131 transfers (quantum key delivery) the plurality of pieces of divided data 18 to a plurality of adjacent intermediate nodes 133 each of which configures another route, over the quantum encryption communication network 13 with the terminal node D132 as a target transmission destination. Further, the terminal node C131 generates a random number key 16 by superimposing a plurality of pieces of divided data 18 by the exclusive OR or the like, and delivers the generated random number key 16 to the user A11.

On the other hand, the terminal node D132 generates a random number key 16 by superimposing a plurality of pieces of divided data 18 subjected to quantum key delivery from a plurality of intermediate nodes 133 by the exclusive OR or the like, and delivers the generated random number key 16 to the user B12. The random number key 16 generated by the terminal node C131 is the same as the random number key 16 generated by the terminal node D132. In other words, the random number key 16 delivered to the user A11 and the user B12 is the random number key 16 shared between the terminal node C131 and the terminal node D132.

The intermediate node 133 performs quantum key delivery of the divided data 18 subjected to quantum key delivery from the terminal node C131 or another intermediate node 133, to the next intermediate node 133 or the terminal node D132 according to a delivery route. Note that data relay in the opposite direction from the terminal node D132 side to the terminal node C131 side may be appropriately performed, at the time of forming a route or the like.

Figure 2:
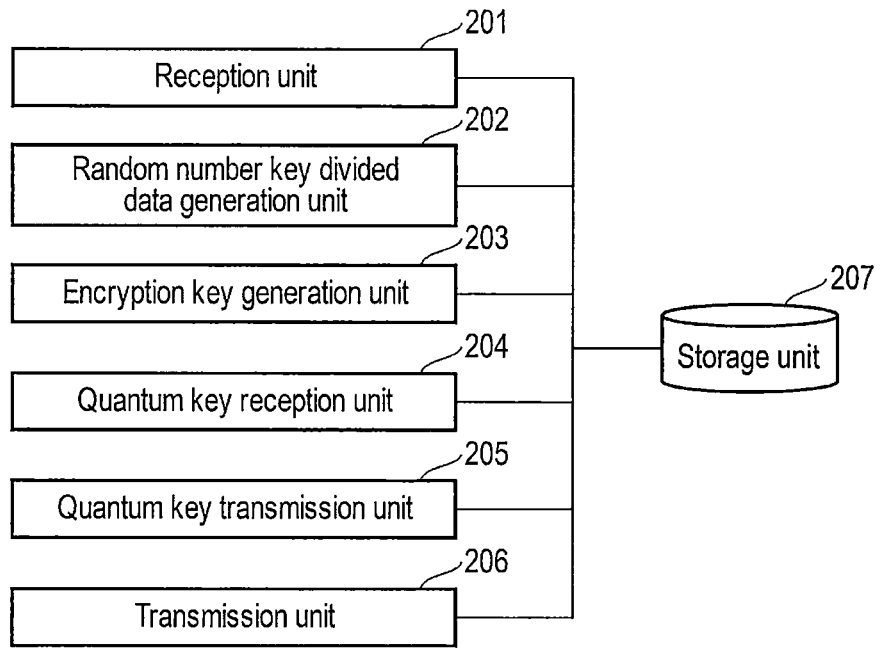
FIG. 2 is a block diagram illustrating an example of a functional configuration in a case where a node in a quantum encryption communication network of the encryption communication system of the first embodiment serves as a terminal node.

FIG. 2 is a block diagram illustrating an example of a functional configuration in a case where a node in the quantum encryption communication network 13 serves as a terminal node (131 and 132).

The terminal nodes 131 and 132 include data processing function units of a reception unit 201, a random number key divided data generation unit 202, an encryption key (random number key) generation unit 203, a quantum key reception unit 204, a quantum key transmission unit 205, and a transmission unit 206, and a storage function unit of a storage unit 207. The data processing function unit may be implemented by a central processing unit (CPU) executing a program, or may be implemented as hardware such as an electric circuit. Various storage apparatuses such as a hard disk drive (HDD) and a solid state drive (SSD) can be applied as the storage function unit.

The reception unit 201 receives a request for a random number key 16 from a user (user A11, user B12). As described above, the request for the random number key 16 is transmitted via, for example, a server that centrally manages a service for providing an encryption key.

The random number key divided data generation unit 202 generates a plurality of pieces of divided data 18 which are data necessary for generating the random number key 16 (in a case of the terminal node C131). As described above, instead of generating a random number as the divided data 18, the quantum key generated by the quantum key delivery function may be diverted as the divided data 18. That is, the random number key divided data generation unit 202 may be performed by a quantum key delivery function.

The encryption key (random number key) generation unit 203 generates a random number key 16 by superimposing a plurality of pieces of divided data 18 (in a case of the terminal node C131) generated by the random number key divided data generation unit 202 or a plurality of pieces of divided data 18 (in a case of the terminal node D132) received by the quantum key reception unit 204 by the exclusive OR or the like.

The quantum key reception unit 204 receives the plurality of pieces of divided data 18 from a plurality of intermediate nodes 133 each of which configures another route (in a case of the terminal node D132). On the other hand, the quantum key transmission unit 205 transfers (quantum key delivery) the plurality of pieces of divided data 18 generated by the random number key divided data generation unit 202 to the plurality of intermediate nodes 133 each of which configures another route (in a case of the terminal node C131). The quantum key reception unit 204 and the quantum key transmission unit 205 may be performed by the quantum key delivery function.

The transmission unit 206 delivers the random number key 16 generated by the encryption key generation unit 203 in response to the request for the random number key 16 from the user (user A11, user B12) received by the reception unit 201. Communication between the terminal node C131 or the terminal node D132 and the user A11 or the user B12 is based on the premise that some confidentiality protection measure is applied. Here, the method is not limited.

The storage unit 207 stores various data including the divided data 18 and the random number key 16. The storage unit 207 also stores an encryption key for executing encryption communication with the intermediate node 133. Note that the various data are erased at appropriate times.

Figure 3:
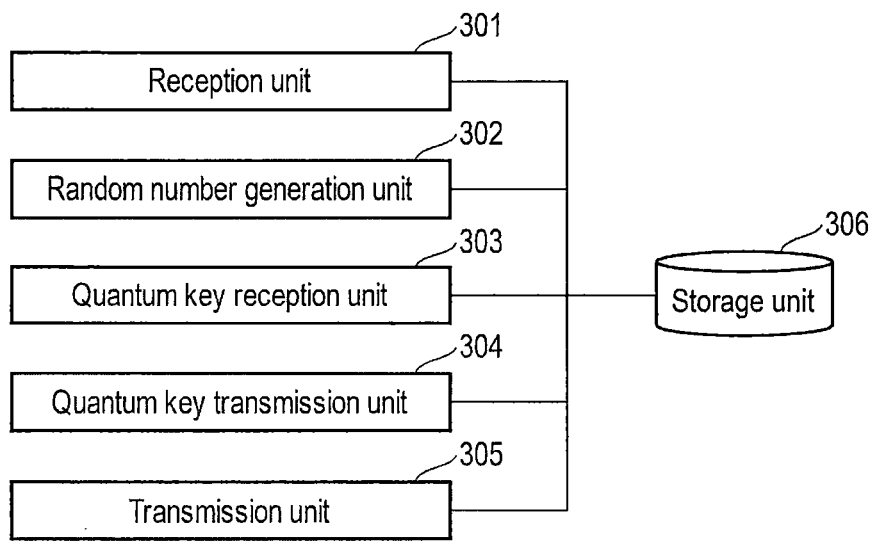
FIG. 3 is a block diagram illustrating an example of a functional configuration in a case where a node in the quantum encryption communication network of the encryption communication system of the first embodiment serves as an intermediate node.

FIG. 3 is a block diagram illustrating an example of a functional configuration in a case where a node in the quantum encryption communication network 13 serves as the intermediate node 133.

The intermediate node 133 includes data processing function units of a reception unit 301, a random number generation unit 302, a quantum key reception unit 303, a quantum key transmission unit 304, and a transmission unit 305, and a storage function unit of a storage unit 306. The data processing function unit may be implemented by the quantum key delivery function and the CPU executing the program, or may be implemented as hardware such as an electric circuit. Various storage devices such as an HDD and an SSD can be applied as the storage function unit.

The reception unit 301 receives a request for quantum key delivery from the terminal node C131 or another intermediate node 133. The random number generation unit 302 generates a random number (an encryption key of a quantum encryption communication network) used for the quantum key delivery. The quantum key reception unit 303 receives the divided data 18 from another intermediate node 133. The quantum key transmission unit 304 performs quantum key delivery on the divided data 18 received by the quantum key reception unit 303 to the intermediate node 133 or the terminal node D132. The transmission unit 305 returns information on availability in response to the request for the quantum key delivery received by the reception unit 301. The storage unit 306 stores various data including the divided data 18 or a random number. Note that the various data are erased at appropriate times.

FIG. 4 is a sequence chart representing a processing procedure of the encryption communication method executed by the encryption communication system of the first embodiment. As an example, it is assumed that three pieces of divided data 18 are generated and delivered by three different routes.

The user A11 requests the random number key 16 from the terminal node C131, and the terminal node C131 receives this request (S1). Note that this request is not directly exchanged between the user A11 and the terminal node C131, but may be exchanged via a server that centrally manages the service for providing the random number key 16.

The terminal node C131 generates a first random number key [1] (divided data 18) and performs quantum key delivery to a first intermediate node 133 of a route 1, and the first intermediate node 133 of the route 1 receives the random number key [1] (S2). Note that the generation of the random number key may be generation of a quantum key by the quantum key delivery function.

The first intermediate node 133 of the route 1 performs quantum key delivery of the random number key [1] to a second intermediate node 133, and then repeats the quantum key delivery of the random number key [1] to an N-th intermediate node 133 (S3).

The N-th intermediate node 133 of the route 1 performs quantum key delivery of the random number key [1] to the terminal node 132 (S4).

Similarly to the first random number key [1], second and third random number keys [2, 3] are also generated at the terminal node C131, and then quantum key delivery is performed to the terminal node D132 via N intermediate nodes 133 of routes 2 and 3 (S5 to S7 and S8 to S10).

The terminal node C131 superimposes the generated three random number keys [1, 2, 3] (divided data 18) by the exclusive OR to generate a random number key 16 (S11). Note that the superposition may use a large number of other methods, for example, addition and subtraction, instead of or together with the exclusive OR.

The terminal node C131 delivers the generated random number key 16 to the user A11 in response to the request for the random number key 16 in step S1 (S12).

The user A11 who has received the random number key 16 from the terminal node C131 encrypts the plaintext data 15 by the Barnum encryption using the random number key 16 to generate encryption data 17. Then, the user A11 delivers the encryption data 17 obtained by encrypting the plaintext data 15 to the user B12 through the Internet network 14 (S13).

On the other hand, the terminal node D132 superimposes the three random number keys [1, 2, 3] (divided data 18) delivered in each of steps S4, S7, and S10 by the same method as that in step S11 to generate the random number key 16 (S14). The terminal node D132 delivers the generated random number key 16 to the user B12 (S15).

The user B12 decrypts the encryption data 17 delivered from the user A11 by using the random number key 16 delivered from the terminal node D132 to acquire the plaintext data 15 (S16).

Figure 5:
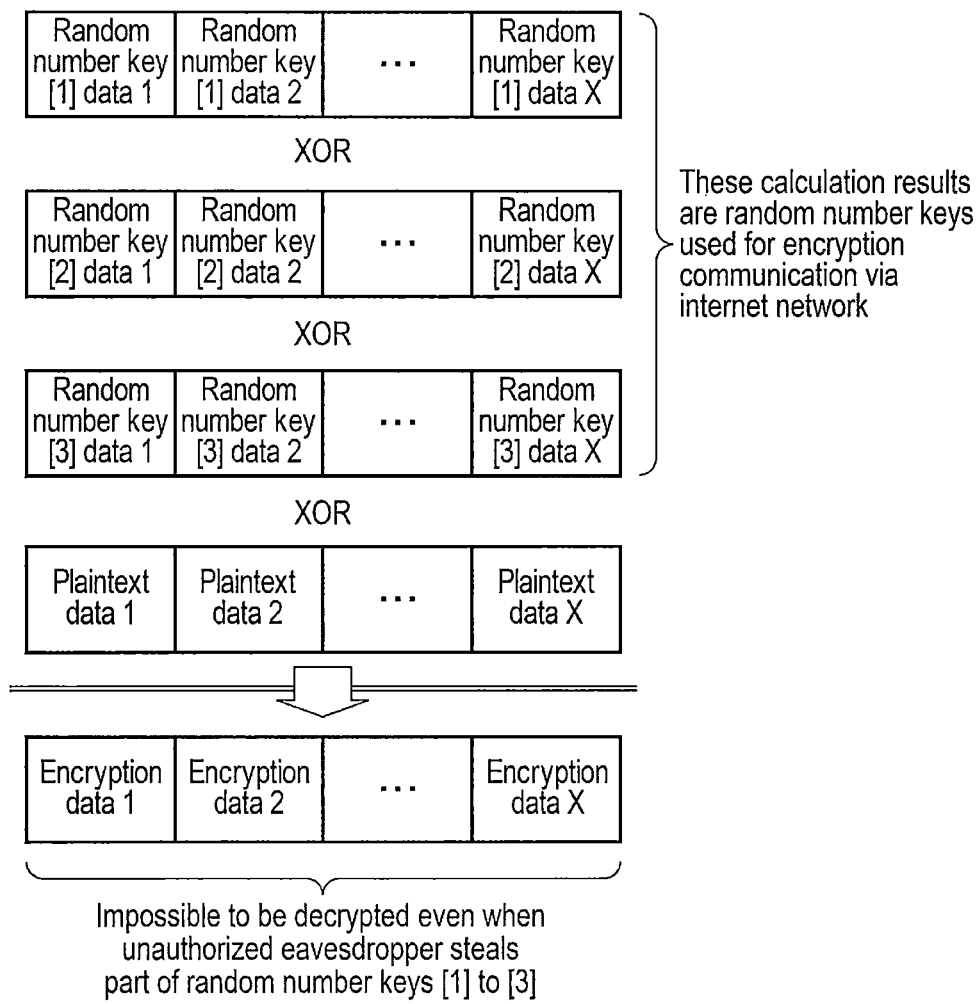
FIG. 5 is a diagram illustrating an example of a method of generating a random number key by a terminal node in the quantum encryption communication network and encryption of plaintext data by a user in the encryption communication system of the first embodiment.

FIG. 5 is a diagram illustrating an example of a method of generating the random number key 16 in the terminal node C131 and encryption of the plaintext data 15 in the user A11.

Here, it is assumed that the generated three random number keys (divided data 18) are a random number key [1], a random number key [2], and a random number key [3], respectively. In the terminal node C131, the random number key 16 is obtained by calculating random number key [1] XOR random number key [2] XOR random number key [3].

On the other hand, in the user A11, the encryption data 17 is obtained by calculating random number key 16 XOR plaintext data 15.

As described above, in the encryption communication system of the first embodiment, since the random number key 16 is generated by superposition of the plurality of pieces of divided data 18 by the Barnum encryption, even when an unauthorized eavesdropper intrudes into a certain intermediate node 133 existing in a certain route and steals a part of the divided data 18, even a part of the encryption data 17 communicated between the user A11 and the user B12 over the Internet network 14 cannot be decrypted.

As described above, in the encryption communication system of the first embodiment, between the transmission source node and the transmission destination node, on the premise of superposition of, for example, the Barnum encryption, data necessary for generating the random number key 16 is distributed to a plurality of systems of paths (routes) and transmitted and received, and the random number key 16 (common key) is shared. Therefore, even when an unauthorized eavesdropper intrudes into an intermediate node on a certain route and steals a part of the data necessary for generating the random number key, the unauthorized eavesdropper cannot decrypt the random number key, thereby maintaining the security of communication of the user.

Second Embodiment

Next, a second embodiment will be described.

In the encryption communication system of the second embodiment, between a transmission source node and a transmission destination node, data necessary for generating a random number key is distributed to a plurality of systems of paths (routes) by using, for example, the secret distribution method and transmitted and received, and the random number key (encryption key of the Internet network) is shared. The encryption communication system of the second embodiment delivers the shared encryption key from the two terminal nodes (the terminal node C131 or the terminal node D132) to the user A11 or the user B12 executing encryption communication.

As a result, even when an unauthorized eavesdropper intrudes into an intermediate node on a certain route and steals a part of data necessary for generating the random number key 16, the unauthorized eavesdropper cannot decrypt the random number key 16, thereby maintaining the security of communication of the user.

Figure 6:
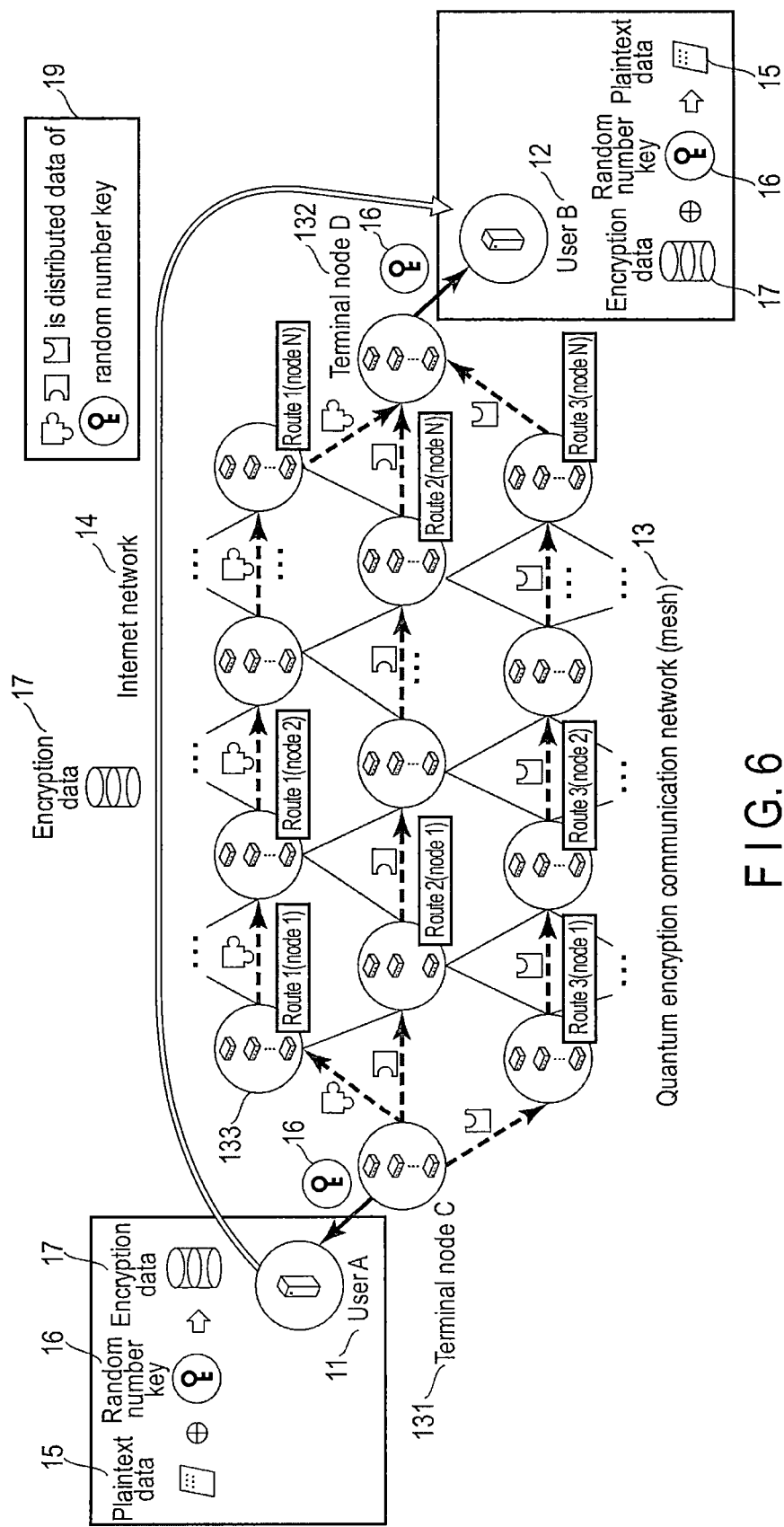
FIG. 6 is a block diagram illustrating an example of a configuration of an encryption communication system of a second embodiment.

FIG. 6 is a block diagram illustrating an example of a configuration of the encryption communication system of the second embodiment. Similarly to the encryption communication system of the first embodiment described above, the encryption communication system of the second embodiment delivers the random number key 16 for encryption communication to the user A11 and the user B12 that transmit and receive the encryption data 17 via the Internet network 14. That is, the encryption communication system of the second embodiment is also a platform that provides the service for delivering an encryption key to a user who executes encryption communication. A difference from the encryption communication system of the first embodiment is that in the encryption communication system of the second embodiment, divided data 18 (see FIG. 1) of the encryption communication system of the first embodiment is replaced with distributed data 19.

In the encryption communication system of the second embodiment, when receiving a request for the random number key 16 from the user A11, the terminal node C131 generates a plurality of pieces of distributed data 19 as data necessary for generating the random number key 16. Note that the distributed data 19 is not necessarily generated by distributing the random number key 16 by the secret distribution method, but is a simple random number, and the simple random number can be regarded as data generated by distributing the random number key 16 by the secret distribution method for convenience. Therefore, similarly to the divided data 18 in the encryption communication system of the first embodiment, the distributed data 19 may be obtained by diverting the quantum key generated by the quantum key delivery function. In addition, similarly to the encryption communication system of the first embodiment, the generation of the distributed data 19 may be continuously performed while the user A11 executes encryption communication.

The terminal node C131 transfers (quantum key delivery) the plurality of pieces of distributed data 19 to a plurality of adjacent intermediate nodes 133 each of which configures another route, over the quantum encryption communication network 13 with the terminal node D132 as a target transmission destination. In addition, even when the distributed data 19 is a simple random number not actually subjected to the secret distribution processing, the terminal node C131 executes restoration processing by the secret distribution method using the exclusive OR or the like to acquire the random number key 16. Note that, in order to simplify the description, here, the random number key 16 is data after the restoration processing, but the random number key 16 may be data obtained by performing some sort of processing on the data after the restoration processing. The terminal node C131 delivers the generated random number key 16 to the user A11.

On the other hand, the terminal node D132 also executes the restoration processing by the secret distribution method using the exclusive OR or the like by using the plurality of pieces of distributed data 19 subjected to quantum key delivery from the plurality of intermediate nodes 133. The terminal node D132 generates the random number key 16 based on the data obtained by the restoration processing, and delivers the generated random number key 16 to the user B12. The random number key 16 generated by the terminal node C131 is the same as the random number key 16 generated by the terminal node D132. In other words, the random number key 16 delivered to the user A11 and the user B12 is the random number key 16 shared between the terminal node C131 and the terminal node D132.

Figure 7:
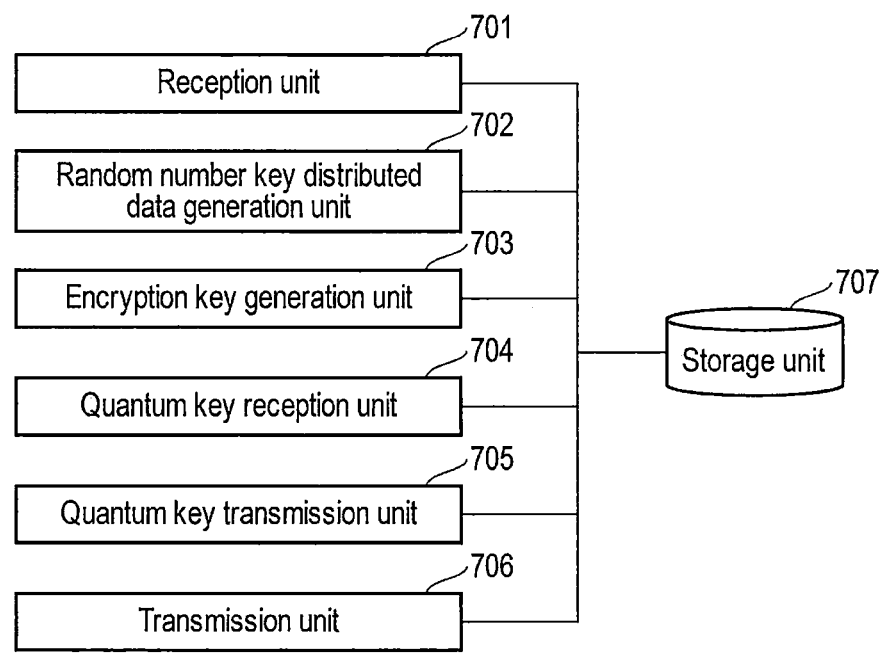
FIG. 7 is a block diagram illustrating an example of a functional configuration in a case where a node in a quantum encryption communication network of the encryption communication system of the second embodiment serves as a terminal node.

FIG. 7 is a block diagram illustrating an example of a functional configuration in a case where a node in the quantum encryption communication network 13 serves as a terminal node (131, 132) in the encryption communication system of the second embodiment.

The terminal nodes 131 and 132 include data processing function units of a reception unit 701, a random number key distributed data generation unit 702, an encryption key generation unit 703, a quantum key reception unit 704, a quantum key transmission unit 705, and a transmission unit 706, and a storage function unit of a storage unit 707. Among them, the reception unit 701, the quantum key reception unit 704, the quantum key transmission unit 705, the transmission unit 706, and the storage unit 707 correspond to the reception unit 201, the quantum key reception unit 204, the quantum key transmission unit 205, the transmission unit 206, and the storage unit 207 of the terminal nodes C131 and D132 of the first embodiment (see FIG. 2). The random number key distributed data generation unit 702 substantially corresponds to the random number key divided data generation unit 202 of the terminal node 131 of the first embodiment, and has a changed name. In addition, a product of the random number key divided data generation unit 202 of the terminal node 131 of the first embodiment is referred to as divided data 18, whereas a product of the random number key distributed data generation unit 702 is referred to as distributed data 19. On the other hand, the encryption key generation unit 703 has the same name as the encryption key generation unit 203 of the terminal nodes 131 and 132 of the first embodiment, but its entity is different. Therefore, only the encryption key generation unit 703 will be described here, and description of the others will be omitted.

The encryption key generation unit 703 uses the plurality of pieces of distributed data 19 (in a case of the terminal node C131) generated by the random number key distributed data generation unit 702 or the plurality of pieces of distributed data 19 (in a case of the terminal node D132) received by the quantum key reception unit 204 to execute restoration processing by the secret distribution method using the exclusive OR or the like. Then, the encryption key generation unit 703 generates the random number key 16 based on the data obtained by the restoration processing. Detail of the generation of the random number key 16 by the secret distribution method will be described later.

Note that, also in the encryption communication system of the second embodiment, the functional configuration in a case where the node in the quantum encryption communication network 13 serves as the intermediate node 133 is similar to that of the encryption communication system of the first embodiment, and thus the description thereof will be omitted.

FIG. 8 is a sequence chart representing a processing procedure of the encryption communication method executed by the encryption communication system of the first embodiment. As an example, it is assumed that three pieces of distributed data 19 are generated and delivered by three different routes.

The user A11 requests the random number key 16 from the terminal node C131, and the terminal node C131 receives this request (S1). Note that this request is not directly exchanged between the user A11 and the terminal node C131, but may be exchanged via a server that centrally manages the service for providing the random number key 16.

The terminal node C131 generates a first random number key [1] (distributed data 19) and performs quantum key delivery to a first intermediate node 133 of a route 1, and the first intermediate node 133 of the route 1 receives the random number key [1] (S2). Note that the generation of the random number key may be generation of a quantum key by the quantum key delivery function.

The first intermediate node 133 of the route 1 performs quantum key delivery of the random number key [1] to a second intermediate node 133, and then repeats the quantum key delivery of the random number key [1] to an N-th intermediate node 133 (S3).

The N-th intermediate node 133 of the route 1 performs quantum key delivery of the random number key [1] to the terminal node 132 (S4).

Similarly to the first random number key [1], second and third random number keys [2, 3] are also generated at the terminal node C131, and then quantum key delivery is performed to the terminal node D132 via N intermediate nodes 133 of routes 2 and 3 (S5 to S7 and S8 to S10).

The terminal node C131 uses the generated three random number keys [1, 2, 3] (distributed data 19) to execute the restoration processing by the secret distribution method using the exclusive OR or the like. The terminal node C131 generates a random number key 16 based on the data obtained by the restoration (S11), and delivers the generated random number key 16 to the user A11 (S12). The generation of the random number key 16 based on the data obtained by the restoration processing by the secret distribution method is to remove dummy information (physical random numbers to be discarded or the like) embedded in order to conceal the secret information (random number key 16).

The user A11 who has received the random number key 16 from the terminal node C131 encrypts the plaintext data 15 by the Barnum encryption using the random number key 16 to generate encryption data 17. Then, the user A11 delivers the encryption data 17 obtained by encrypting the plaintext data 15 to the user B12 through the Internet network 14 (S13). On the other hand, the terminal node D132 uses the three random number keys [1, 2, 3] (distributed data 19) delivered in each of steps S4, S7, and S10 to execute the restoration processing by the secret distribution method using the exclusive OR or the like. The terminal node D132 generates the random number key 16 based on the data obtained by the restoration (S14), and delivers the generated random number key 16 to the user B12 (S15).

The user B12 decrypts the encryption data 17 delivered from the user A11 by using the random number key 16 delivered from the terminal node D132 to acquire the plaintext data 15 (S16).

Here, a method of generating the random number key 16 by the terminal node C131 or D132 in the encryption communication system of the second embodiment will be described with reference to FIGS. 9 and 10.

Figure 9:
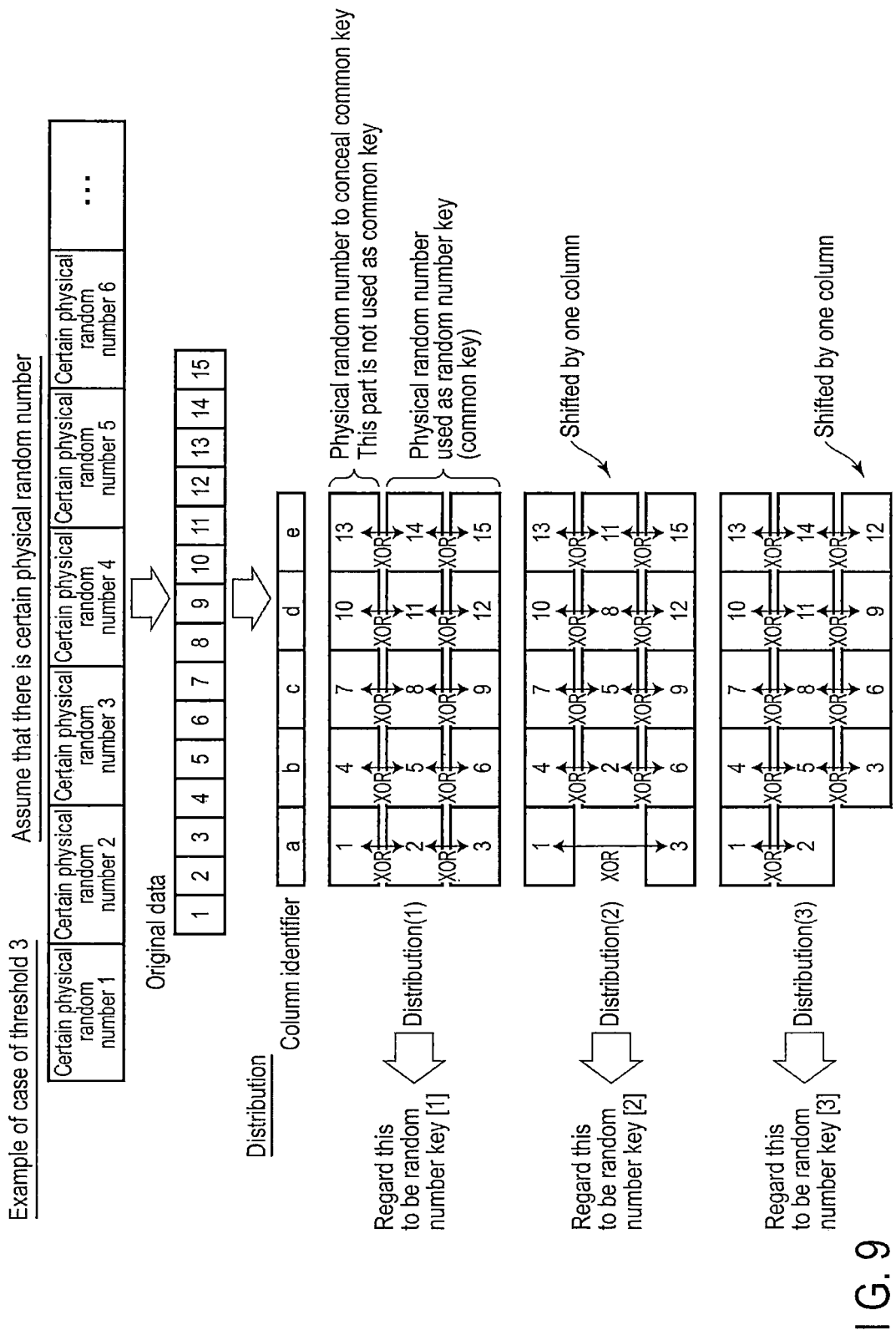
FIG. 9 is a first diagram illustrating an example of a method of generating a random number key by ramp-type secret distribution with a distribution number 3 and a threshold 3 in the encryption communication system of the second embodiment.

FIG. 9 is a first diagram illustrating an example of a method of generating a random number key 16 by the terminal node C131 in the encryption communication system of the second embodiment. Here, a case where the random number key 16 is generated by a ramp-type secret distribution (this example is a (threshold K=3, L=2, and distribution number N=3) ramp-type secret distribution) with a distribution number 3 and a threshold 3 will be described as an example. In the case of the ramp-type secret distribution, even when one of the three pieces of distributed data 19 is eavesdropped, restoration cannot be performed. Furthermore, here, it is assumed that a ratio between the random number (dummy data, that is, a physical random number to be discarded) and the plaintext (here, a physical random number used as a common key, that is, the random number key 16) is "1:2". The ramp type is a type in which the ratio between the random number and the plaintext can be changed, and in a case where the ratio between the random number and the plaintext is "(threshold−1):1", it is particularly referred to as perfect secret distribution.

First, it is assumed that there is a) certain physical random number in the terminal node C131. Then, it is assumed that the terminal node C131 executes distribution processing by ramp-type secret distribution with a threshold 3, considering the physical random number as original data. Then, the terminal node C131 regards arbitrarily generated random numbers (random number key [1], random number key [2], and random number key [3]) as being obtained by this distribution. That is, the terminal node C131 does not actually generate the distributed data 19 by secret distribution here. Therefore, the distributed data 19 can be obtained by diverting the quantum key generated by the quantum key delivery function, and the efficiency of the physical random number generation is improved. As described above, the present invention has features that are not included in data transfer using simple secret distribution. Note that the distributed data 19 may be generated by performing distribution processing on the random numbers (random number key [1], random number key [2], and random number key [3]) arbitrarily generated here by the secret distribution method. However, in this case, in the terminal node C131, in addition to the quantum key (physical random number) generated by the quantum key delivery function, a physical random number to be the original data also needs to be unnecessarily generated, and the efficiency of the physical random number generation deteriorates.

More specifically, the distribution processing of the ramp-type secret distribution of the threshold 3 will be described. First, the original data is distributed to the number of thresholds. For example, when the original data is "1 to 15", the original data is divided into "1, 4, 7, 10, and 13", "2, 5, 8, 11, and 14", and "3, 6, 9, 12, and 15". In FIG. 9, each group after distribution is represented by a row.

Subsequently, in generating, three pieces of distributed data, a second row is shifted by one column for a distribution (2), a third row is shifted by one column for a distribution (3), and then, for example, convolution by the exclusive OR is executed for each of the distributions (1) to (3). Note that this convolution is not limited to the exclusive OR, and may be calculation by a polynomial, addition, subtraction, or the like.

When generating a random number, the terminal node C131 regards the random number as distributed data obtained by the above procedure (distribution processing by ramp-type secret distribution with the threshold 3). That is, the terminal node C131 generates a plurality of random number sequences (random number key [1], random number key [2], and random number key [3]), and regards each random number sequence as distributed data. The terminal node C131 distributes the random number (distributed data 19) to another route for each random number sequence and transfers the random number to the terminal node D132.

Figure 10:
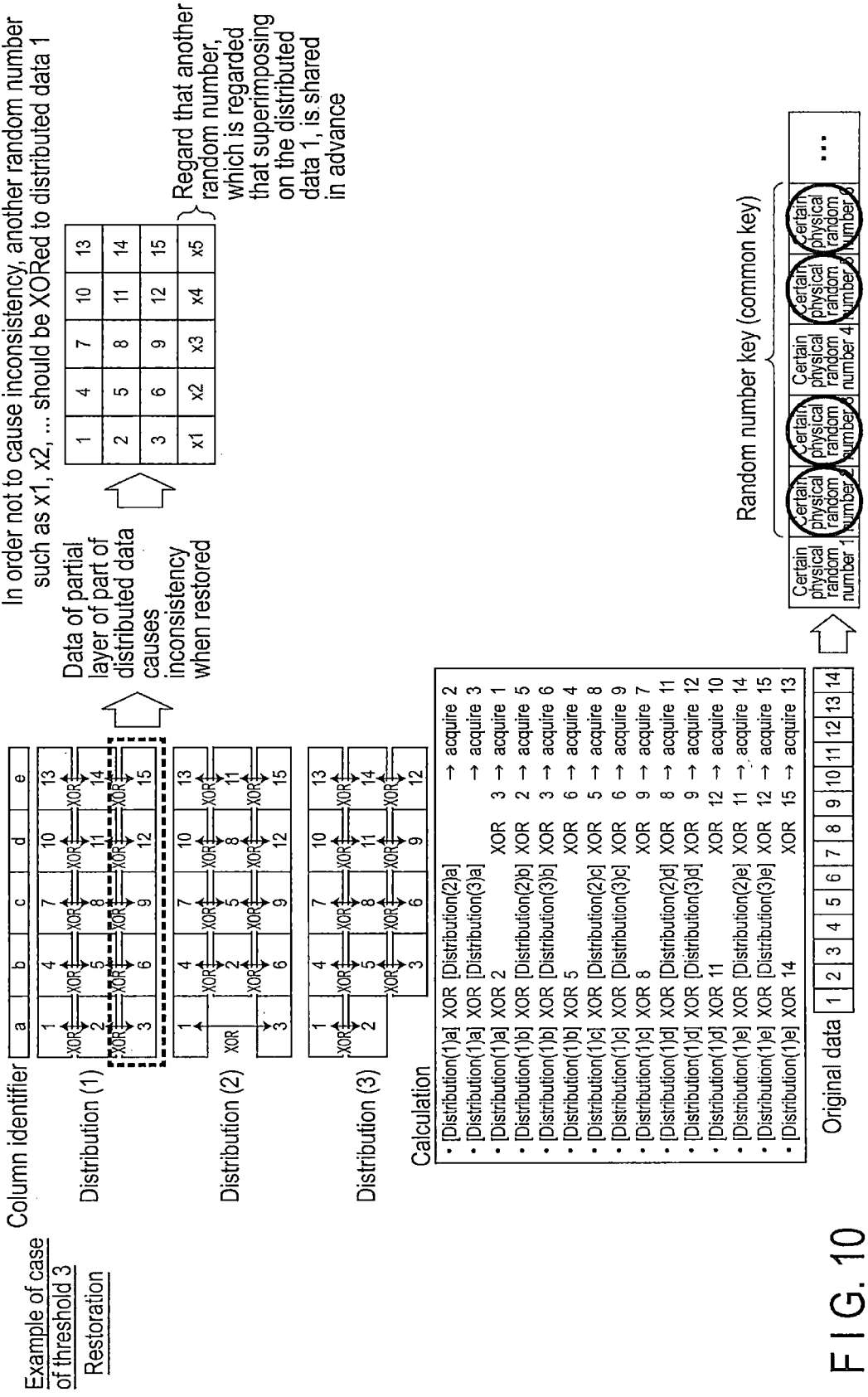
FIG. 10 is a second diagram illustrating an example of a method of generating a random number key by the ramp-type secret distribution with a distribution number 3 and a threshold 3 in the encryption communication system of the second embodiment.

FIG. 10 is a second diagram illustrating an example of a method of generating the random number key 16 by the terminal node C131 in the encryption communication system of the second embodiment.

The terminal node C131 uses the three pieces of distributed data 19 (actually, simple random numbers) to execute the restoration processing by the ramp-type secret distribution (this example is the (threshold K=3, L=2, and distribution number N=3) ramp-type secret distribution) with the distribution number 3 and the threshold 3 ("calculation" in FIG. 10). By this restoration, the above-described original data "1 to 15" of the hypothetical physical random number is obtained.

Note that when the restoration processing is executed in this manner without executing the distribution processing by the secret distribution method, data (original data) of a partial layer (row) of a part of the distributed data causes inconsistency (when all the distributed data are restored to the original data, the original data does not match in some distributed data). In order not to cause inconsistency, it is only required to regard that another random number (x1 to x5) is XORed to some distributed data. This may be considered as being shared in advance between the terminal node C131 and the terminal node D132. Note that when it is determined in advance or dynamically from which distributed data the original data is generated between the terminal node C131 and the terminal node D132, at least the original data generated in the terminal node C131 and the terminal node D132 match, and thus this inconsistency does not cause a problem. Note that although there is some inconsistency, the physical random numbers (random number key [1], random number key [2], and random number key [3]) are regarded as distributed data, and the restoration processing by the secret distribution method is executed, thereby sufficiently securing the security.

Here, since it is assumed that the ratio between the random number and the plaintext is "1:2", the terminal node C131 removes, for example, "1, 4, 7, and 13" (for one predetermined row) from the restored original data "1 to 15" as dummy data (physical random numbers to be discarded), and extracts "2, 3, 5, 6, 8, 9, 11, 12, 14, and 15" (for two predetermined rows), thereby generating the random number key 16 to be delivered to the user A11.

In a case of the perfect secret distribution, since the ratio between the random number and the plaintext is the "threshold−1:1" ("2:1"), for example, the terminal node C131 removes "1, 2, 4, 5, 7, 8, 10, 11, 13, and 14" (for two predetermined rows) as dummy data (physical random numbers to be discarded) and extracts "3, 6, 9, 12, and 15" (for one predetermined row), thereby generating the random number key 16 to be delivered to the user A11.

On the other hand, the terminal node D132 that has received the distributed data 19 from the terminal node C131 also performs the same calculation as the terminal node C131 to generate the random number key 16 to be delivered to the user B12. The random number key 16 generated by the terminal node C131 is the same as the random number key 16 generated by the terminal node D132. In other words, the random number key 16 delivered to the user A11 and the user B12 is the random number key 16 shared between the terminal node C131 and the terminal node D132.

In the encryption communication system of the first embodiment, n×(⅓) random number keys 16 are generated by using n random numbers (divided data 18). On the other hand, in the encryption communication system of the second embodiment, for example, when the ratio between the random number and the plaintext is "1:2", n×(⅔) random number keys 16 are generated by using the n random numbers (distributed data 19). Therefore, the consumption of random number can be reduced. Therefore, in this example, the communication rate is also doubled. Note that, in a case where the ratio between the random number and the plaintext is the perfect secret distribution of "threshold−1: 1", n×(⅓) random number keys 16 are generated. That is, the superposition and the consumption of the random numbers in the encryption communication system of the first embodiment are the same.

Figure 11:
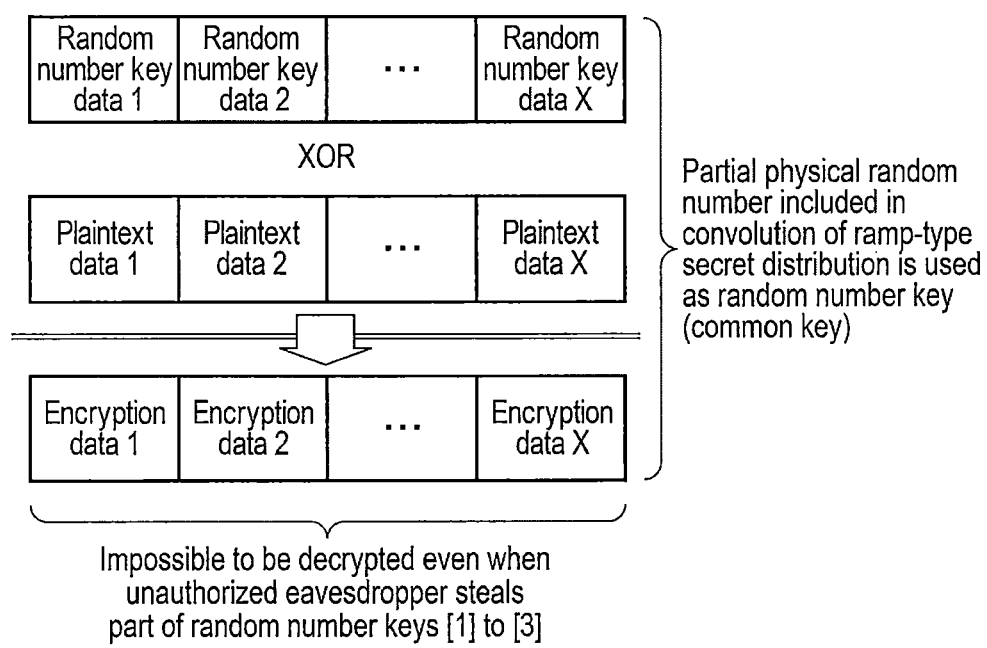
FIG. 11 is a diagram illustrating an example of encryption of plaintext data by a user in the encryption communication system of the second embodiment.

FIG. 11 is a diagram illustrating an example of encryption of the plaintext data 15 by the user A11.

As in the case of the encryption communication system of the first embodiment, also in the encryption communication system of the second embodiment, the user A11 obtains the encryption data 17 by calculating random number key 16 XOR plaintext data 15.

As described above, the encryption communication system of the second embodiment delivers a plurality of pieces of distributed data 19 (actually, simple random numbers) which are regarded as distributed by the ramp-type secret distribution method, so that even when an unauthorized eavesdropper intrudes into a certain intermediate node existing in a certain route and steals a part of the distributed data 19, information of the random number key 16 is not leaked. Therefore, even a part of the encryption data 17 communicated between the user A11 and the user B12 via the Internet network 14 cannot be decrypted.

As described above, in the encryption communication system of the second embodiment, between the transmission source node and the transmission destination node, on the premise of the restoration processing by the secret distribution method, the data necessary for generating the random number key 16 is distributed to a plurality of systems of paths (routes) and transmitted and received, and the random number key 16 (common key) is shared. Therefore, even when an unauthorized eavesdropper intrudes into an intermediate node on a certain route and steals a part of the data necessary for generating the encryption key, the unauthorized eavesdropper cannot decrypt the encryption key, thereby maintaining the security of communication of the user. In addition, although the example in which the distribution number is 3, which is the same as the threshold, has been described here, when the distribution number is distribution number=threshold+α (α=1, 2, 3, . . . ), since the random number key 16 can be generated even when (distribution number−threshold) pieces of distributed data are lost, even when malfunction occurs in some intermediate nodes 133, the terminal node C131 and the terminal node D132 can share the random number key 16 without any problem.

By the way, in the above description, on the assumption of existence of certain original data, the restoration by the ramp-type secret distribution with the distribution number 3 and the threshold 3 is executed, and when the ratio between the random number and the plaintext is "1:2", one row (out of three rows) is removed as a random number (dummy data) from the data obtained by the restoration, and data of two rows is used as the random number key 16. Here, when an information theoretical safety is given up, all of the data obtained by the restoration can be used as the plaintext (random number key 16), or not all of one row but only a part of the row can be used as a random number. Even in this case, although the information theoretical safety cannot be secured, the number of combinations of operators for obtaining the original data is enormous, thereby sufficiently securing the security of the encryption communication of the user. Then, in this case, the consumption of the random number can be greatly reduced. Therefore, a transfer rate is also improved accordingly.

In a case where the threshold is 2, in order to secure the information theoretical safety, the ratio between the random number and the plaintext is only "1:1". However, as described above, when the information theoretical safety is given up, all the data obtained by the restoration can be used as the plaintext, or not all of one row (out of two rows) but only a part of the row can be used as the random number. Even in this case, although the information theoretical safety cannot be secured, the number of combinations of operators for obtaining the original data is enormous, thereby sufficiently securing the security of the encryption communication of the user. Therefore, the consumption of the random number can be greatly reduced. Note that, here, in order to simplify the description, the secret distribution methods of FIGS. 9 and 10 have been described. However, the available secret distribution method is not limited to this, and for example, a secret distribution method using another exclusive OR, a secret distribution method using a polynomial, or the like can be used.

A method of generating the random number key 16 by secret distribution with a threshold 2 will be described with reference to FIGS. 12 and 13. FIG. 12 is a first diagram illustrating an example of a method of generating the random number key 16 by secret distribution with the threshold 2 and the distribution number 3.

First, it is assumed that there is a certain physical random number in the terminal node C131. In addition, it is assumed that the terminal node C131 is subjected to distribution processing by the secret distribution method with the threshold 2, considering it as original data. The terminal node C131 regards arbitrarily generated random numbers (random number key [1], random number key [2], and random number key [3]) as being obtained by this distribution processing. That is, as described above, the terminal node C131 does not actually generate the distributed data 19 by the secret distribution. As described above, the present invention has features that are not included in data transfer using simple secret distribution. As described above, the secret distribution processing may be actually executed here, but in this case, the efficiency of the physical random number generation deteriorates.

More specifically, the secret distribution with the threshold 2 will be described. First, the original data is distributed to the number of thresholds. For example, when the original data is "1 to 14", the data is distributed to "1, 3, 5, 7, 9, 11, and 13" and "2, 4, 6, 8, 10, 12, and 14". In FIG. 12, each group after distribution is represented by a row.

Subsequently, in generating three pieces of distributed data, a second row is shifted by one column for a distribution (2), a second row is shifted by two columns for a distribution (3), and then, for example, convolution by the exclusive OR is executed for each of the distributions (1) to (3). Note that this convolution is not limited to the exclusive OR, and may be calculation by a polynomial, addition, subtraction, or the like.

When generating a random number, the terminal node C131 regards the random number as distributed data obtained by the above procedure (secret distribution with threshold 2). The terminal node C131 distributes the random number (distributed data 19) to another route for each random number sequence (random number key [1], random number key [2], and random number key [3]) and transfers the random number to the terminal node D132.

FIG. 13 is a second diagram illustrating an example of a method (restoration processing) of generating the random number key 16 by secret distribution with the threshold 2.

The terminal node C131 uses the three pieces of distributed data 19 (actually, simple random numbers) to execute restoration by secret distribution with a distribution number 3 and a threshold 2 ("calculation" in FIG. 13). By this restoration, the above-described original data "1 to 14" of the hypothetical physical random number is obtained.

Note that, in the case of the ramp-type secret distribution with the threshold 2 and the distribution number 2, no inconsistency occurs in the restoration. However, in the case of secret distribution with the threshold 2 and a distribution number 2+α (α=1, 2, 3, . . . ), similarly to the case of the ramp-type secret distribution with the distribution number 3 and the threshold 3 described above, when the data is restored, inconsistency occurs in data of a part of layers of a part of the distributed data. Therefore, similarly to the case of the ramp-type secret distribution with the distribution number 3 and the threshold 3 described above, it is regarded that another random number shared in advance is superimposed.

Also by the generation of the random number key 16 by the secret distribution with the threshold 2, the encryption communication system of the second embodiment delivers a plurality of pieces of distributed data 19 (actually, simple random numbers) which are regarded as distributed by the secret distribution, and even when an unauthorized eavesdropper intrudes into a certain intermediate node existing in a certain route and steals a part of the distributed data 19, even a part of the encryption data 17 communicated between the user A11 and the user B12 via the Internet network 14 cannot be decrypted. In addition, since the threshold 2 and the distribution number 3 are used in this example, the random number key 16 can be generated even when (distribution number−threshold)=1 piece of distributed data is lost, and thus, even when a malfunction occurs in one route of the intermediate node 133, the terminal node C131 and the terminal node D132 can share the random number key 16 without any problem. Note that, here, in order to simplify the description, the secret distribution methods of FIGS. 12 and 13 have been described. However, the available secret distribution method is not limited to this, and for example, a secret distribution method using another exclusive OR, a secret distribution method using a polynomial, or the like can be used.

(Route Formation [1])

In the encryption communication system of the first embodiment, a plurality of routes for transmitting and receiving the divided data 18 are formed between the terminal node C131 and the terminal node 132. In addition, in the encryption communication system of the second embodiment, the plurality of routes for transmitting and receiving the distributed data 19 are formed between the terminal node C131 and the terminal node 132.

Figure 14:
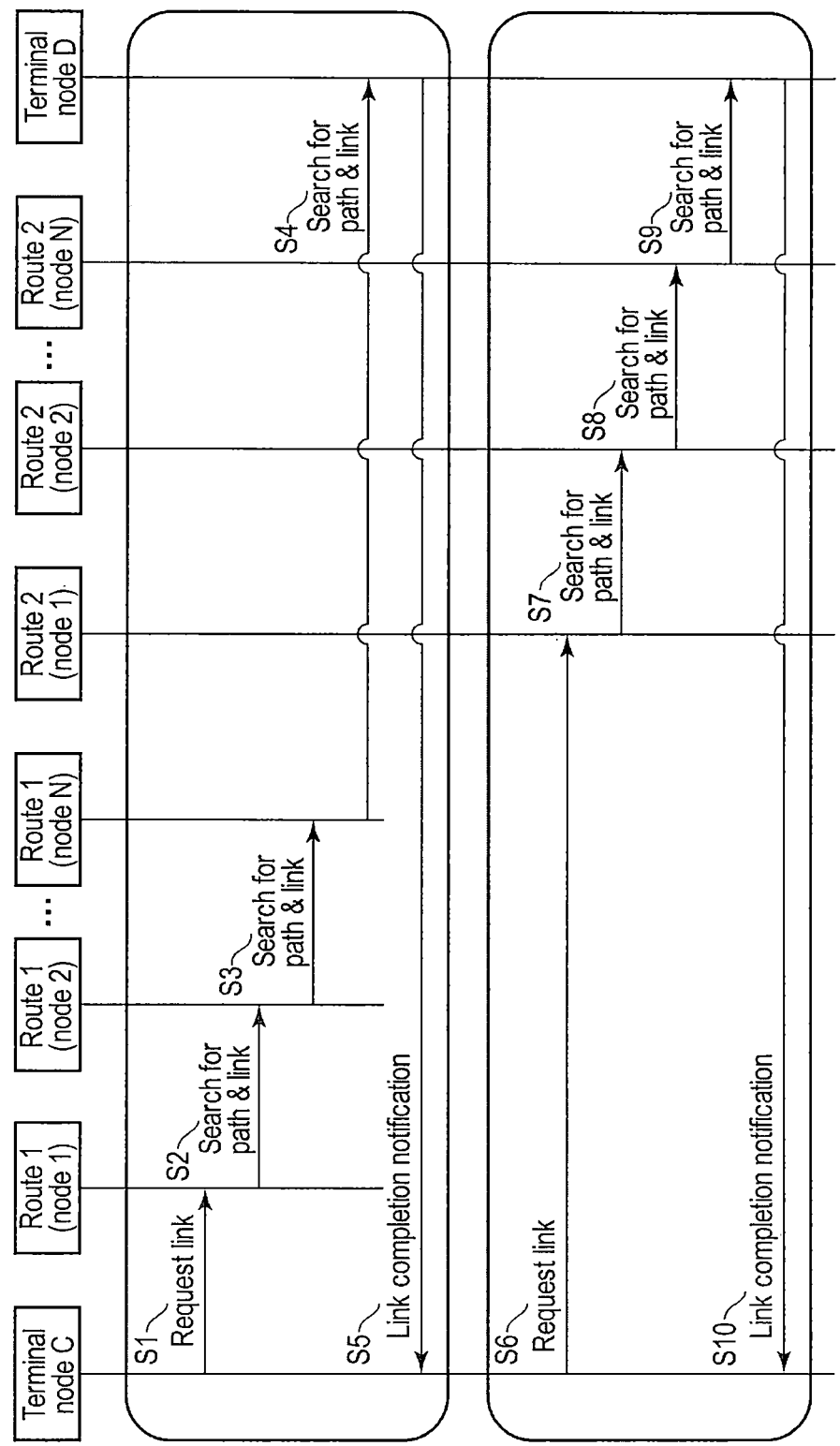
FIG. 14 is a sequence chart illustrating a first example of a formation of a route between two nodes over a quantum encryption communication network 13 in the encryption communication system of the first embodiment or the second embodiment.

Here, a first example of forming the plurality of routes between the terminal node C131 and the terminal node D132 over the quantum encryption communication network 13 will be described with reference to FIG. 14. The first example is a so-called dynamic link in which each node in the quantum encryption communication network 13 autonomously operates to generate the plurality of routes. According to a path search by the dynamic link, when there is a failure in the intermediate node 133 during communication between the terminal nodes 131 and 132, it is possible to select a detour path for communication while avoiding the failed node.

The terminal node C131 requests a link to the terminal node D132 from the first intermediate node of the route 1 (S1). The first intermediate node of the route 1 searches for a path with respect to the adjacent intermediate node, determines the second intermediate node of the route 1, and requests a link (S2). When the destination terminal node D132 is adjacent at the time of the path search, the link is requested to the terminal node D132. The path search and the link are repeated from a second to N-th nodes until the link can be requested to the destination terminal node D132 (S3 and S4). The terminal node D132 that has received the link request from the intermediate node 133 transmits a link completion notification to the terminal node C131 (S5).

The terminal node C131 requests a link to the terminal node D132 from the first intermediate node of the route 2, and performs processing similar to that of the route 1 (S6 to S10). This is repeated for the number of pieces of divided data 16 of the random number key or the number of pieces of divided data 18 of the random number key, and delivery routes of all the data are determined.

As a result, the number of routes between the terminal node C131 and the terminal node D132 are formed over the quantum encryption communication network 13 as many as the target number. As described above, according to the path search by the dynamic link, when there is a failure in the intermediate node 133 during communication between the terminal nodes 131 and 132, it is possible to select a detour path for communication while avoiding the failed node.

Note that, in a case where each intermediate node 133 receives a request for a coupling (link) including designation of the terminal node D132 as a counterpart from a certain intermediate node 133 and then also receives a request for a coupling (link) including designation of the terminal node D132 as a counterpart from another certain intermediate node 133, it is preferable to reply "reject" to the request from the another certain intermediate node 133. As a result, it is possible to avoid that one intermediate node 133 is interposed on a plurality of routes. In other words, it is possible to prevent a plurality of pieces of divided data 18 or distributed data 19 from being stolen by an attack on a certain intermediate node 133.

(Route Formation [2])

Next, a second example in which a plurality of routes between the terminal node C131 and the terminal node D132 are formed over the quantum encryption communication network 13 will be described. The second example is a so-called static link that generates the plurality of routes under the management of a path management server that manages routes that can be formed over the quantum encryption communication network 13. By centrally managing the path information by the path management server, it is possible to provide an appropriate route, and it is possible to check the presence or absence of a failed node before communication and select a path not including the failed node.

FIG. 15 is a block diagram illustrating an example of a configuration of the path management server. The path management server includes a reception unit 1501, an information management unit 1502, a path calculation unit 1503, a transmission unit 1504, and a storage unit 1505.

The reception unit 1501 receives a link establishment request from the terminal node D131. In addition, for example, in a case where addition or migration of a node occurs over the quantum encryption communication network 13, the reception unit 1501 receives a request for updating the path information from a program or the like that provides a graphical user interface (GUI) to an operator.

The information management unit 1502 updates the path information in the storage unit 1505 when the reception unit 1501 receives the request for updating the path information.

When the reception unit 1501 receives the link establishment request, the path calculation unit 1503 calculates a path based on the path information of the storage unit 1505. As a path calculation algorithm, for example, a round robin method or a least connection method may be used.

The transmission unit 1504 transmits the processing result of the information management unit 1502 to the request source. In addition, as the processing result of the path calculation unit 1503, a link destination instruction is transmitted to the intermediate node 133 or the terminal nodes 131 and 132, and a link completion notification including information of the coupled node is transmitted to the request source.

The storage unit 1505 stores, for example, information of the intermediate node 133 or the terminal nodes 131 and 132 as path information related to all users including the users A11 and B12.

Figure 16:
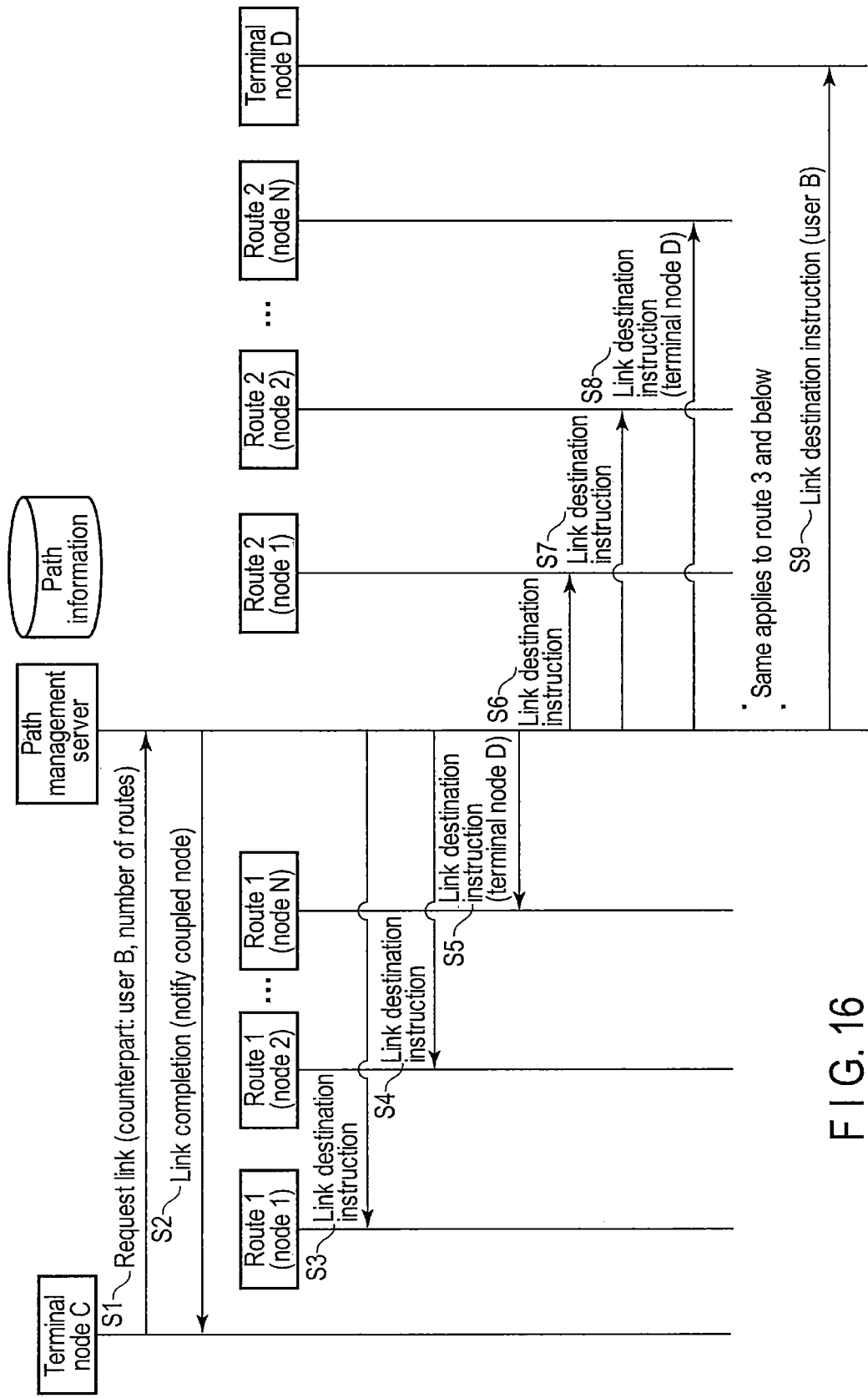
FIG. 16 is a sequence chart illustrating a second example of a formation of a route between two nodes over the quantum encryption communication network 13 in the encryption communication system of the first embodiment or the second embodiment.

FIG. 16 is a sequence chart illustrating the second example of forming a plurality of routes between the terminal node C131 and the terminal node D132 over the quantum encryption communication network 13.

The terminal node C131 transmits the link establishment request including the destination and the number of routes to the path management server (S1). The path management server calculates a path based on the information in the request and the path information, and transmits the link completion notification including the information of the coupling destination node to the terminal node C131. In addition, the path management server transmits link destination instructions for configuring the route to all the intermediate nodes 133 or the terminal nodes 132 included in the calculated route (S3 to S9).

Note that the path management server selects a route such that one intermediate node 133 is not interposed on a plurality of routes.

As a result, the number of routes between the terminal node C131 and the terminal node D132 are formed over the quantum encryption communication network 13 as many as the target number. As described above, by centrally managing the path information by the path management server, it is possible to provide an appropriate route, and it is possible to check the presence or absence of a failed node before communication and select a path not including the failed node. In addition, it is possible to avoid that one intermediate node 133 is interposed on a plurality of routes, and it is possible to prevent a plurality of pieces of divided data 18 or distributed data 19 from being stolen by an attack on a certain intermediate node 133.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be Made without departing from the spirit of the inventions. The accompanying claims and their equivalents are intended to cover such forms or modifications as would fall within the scope and spirit of the inventions.

What is claimed is:

1. An encryption communication system that delivers an encryption key to a first user and a second user who execute encryption communication, the encryption communication system comprising:
   a network; and
   a plurality of nodes, each of the plurality of nodes comprising a hardware component,
   wherein the encryption communication system is configured to share the encryption key between a first node that delivers the encryption key to the first user and a second node that delivers the encryption key to the
second user among the plurality of nodes,
the first node is configured to
form n (n>1) systems of paths to the second node over
the network,
generate n pieces of first data,
distribute the n pieces of first data to the n systems of
paths and transmit the n pieces of first data to the
second node, and
generate the encryption key by superimposing the n
pieces of first data,
the second node is configured to
receive the n pieces of first data from the first node via
the n systems of paths, and
generate the encryption key by superimposing the n
pieces of first data,
each of the plurality of nodes has a function of searching
for a node suitable for forming a path from among all
adjacent nodes over the network,
the first node is configured to request, at a start of delivery
of the encryption key, a coupling for forming the path
to n adjacent third nodes over the network, and
when the second node is coupled to an adjacent fourth
node over the network requesting coupling for forming
the path, the second node is configured to notify the
first node of completion of formation of the path via the
path formed including the fourth node.

2. The encryption communication system of claim 1,
wherein the superimposing the n pieces of first data is
calculating an exclusive OR of the n pieces of first data.

3. An encryption communication system that delivers an
encryption key to a first user and a second user who execute
encryption communication, the encryption communication
system comprising:
a network;
a plurality of nodes, each of the plurality of nodes
comprising a hardware component; and
a path management server configured to manage a path
that can be formed over the network,
wherein the encryption communication system is configured to share the encryption key between a first node
that delivers the encryption key to the first user and a
second node that delivers the encryption key to the
second user among the plurality of nodes,
the first node is configured to
form n (n>1) systems of paths to the second node over
the network,
generate n pieces of first data,
distribute the n pieces of first data to the n systems of
paths and transmit the n pieces of first data to the
second node, and
generate the encryption key by superimposing the n
pieces of first data,
the second node is configured to
receive the n pieces of first data from the first node via
the n systems of paths, and
generate the encryption key by superimposing the n
pieces of first data, and
the first node is configured to request the path management server to form n systems of paths to the second
node at a start of delivery of the encryption key.

4. An encryption communication system that delivers an
encryption key to a first user and a second user who execute
encryption communication, the encryption communication
system comprising:
a network; and
a plurality of nodes, each of the plurality of nodes
comprising a hardware component,
wherein the encryption communication system is configured to share the encryption key between a first node
that delivers the encryption key to the first user and a
second node that delivers the encryption key to the
second user among the plurality of nodes,
the first node is configured to
form n (n>1) systems of paths to the second node over
the network,
generate n pieces of first data,
distribute the n pieces of first data to the n systems of
paths and transmit the n pieces of first data to the
second node, and
generate the encryption key by superimposing the n
pieces of first data,
the second node is configured to
receive the n pieces of first data from the first node via
the n systems of paths, and
generate the encryption key by superimposing the n
pieces of first data, and
the n systems of paths are formed such that a same node
is not redundantly applied to a plurality of paths among
the n systems of paths.

5. The encryption communication system of claim 1,
wherein:
the network has a configuration in which the plurality of
nodes are coupled by an optical fiber; and
each of the plurality of nodes are configured to transmit
and receive data to and from an adjacent node over the
network by photons using the optical fiber as a medium.

6. An encryption communication system that delivers an
encryption key to a first user and a second user who execute
encryption communication, the encryption communication
system comprising:
a network; and
a plurality of nodes, each of the plurality of nodes
comprising a hardware component,
wherein the encryption communication system is configured to share the encryption key between a first node
that delivers the encryption key to the first user and a
second node that delivers the encryption key to the
second user among the plurality of nodes,
the first node is configured to
form n (n>1) systems of paths to the second node over
the network,
generate n pieces of first data,
distribute the n pieces of first data to the n-systems of
paths and transmit the n pieces of first data to the
second node, and
generate the encryption key based on second data
obtained by restoration by a secret distribution
method in which the n pieces of first data are
regarded as distributed data,
the second node is configured to
receive the n pieces of first data from the first node via
the n systems of paths, and
generate the encryption key based on second data
obtained by restoration by the secret distribution
method in which the n pieces of first data are
regarded as distributed data,
each of the plurality of nodes has a function of searching
for a node suitable for forming a path from among all
adjacent nodes over the network,
the first node is configured to request, at a start of delivery
of the encryption key, a coupling for forming the path
to n adjacent third nodes over the network, and when the second node is coupled to an adjacent fourth node over the network requesting coupling for forming the path, the second node is configured to notify the first node of completion of formation of the path via the path formed including the fourth node.

7. The encryption communication system of claim 6, wherein the secret distribution method is a ramp-type secret distribution method including a perfect secret distribution method.

8. An encryption communication system that delivers an encryption key to a first user and a second user who execute encryption communication, the encryption communication system comprising:
a network;
a plurality of nodes, each of the plurality of nodes comprising a hardware component; and
a path management server configured to manage a path that can be formed over the network,
wherein the encryption communication system is configured to share the encryption key between a first node that delivers the encryption key to the first user and a second node that delivers the encryption key to the second user among the plurality of nodes,
the first node is configured to
form n (n>1) systems of paths to the second node over the network,
generate n pieces of first data,
distribute the n pieces of first data to the n-systems of paths and transmit the n pieces of first data to the second node, and
generate the encryption key based on second data obtained by restoration by a secret distribution method in which the n pieces of first data are regarded as distributed data,
the second node is configured to
receive the n pieces of first data from the first node via the n systems of paths, and
generate the encryption key based on second data obtained by restoration by the secret distribution method in which the n pieces of first data are regarded as distributed data, and
the first node is configured to request the path management server to form n systems of paths to the second node at a start of delivery of the encryption key.

9. An encryption communication system that delivers an encryption key to a first user and a second user who execute encryption communication, the encryption communication system comprising:
a network; and
a plurality of nodes, each of the plurality of nodes comprising a hardware component,
wherein the encryption communication system is configured to share the encryption key between a first node that delivers the encryption key to the first user and a second node that delivers the encryption key to the second user among the plurality of nodes,
the first node is configured to
form n (n>1) systems of paths to the second node over the network,
generate n pieces of first data,
distribute the n pieces of first data to the n-systems of paths and transmit the n pieces of first data to the second node, and
generate the encryption key based on second data obtained by restoration by a secret distribution method in which the n pieces of first data are regarded as distributed data,
the second node is configured to
receive the n pieces of first data from the first node via the n systems of paths, and
generate the encryption key based on second data obtained by restoration by the secret distribution method in which the n pieces of first data are regarded as distributed data, and
the n systems of paths are formed such that a same node is not redundantly applied to a plurality of paths among the n systems of paths.

10. The encryption communication system of claim 6, wherein:
the network has a configuration in which the plurality of nodes are coupled by an optical fiber; and
each of the plurality of nodes are configured to transmit and receive data to and from an adjacent node over the network by photons using the optical fiber as a medium.

11. An encryption communication apparatus that delivers an encryption key to one user of two users who execute encryption communication, the encryption communication apparatus sharing the encryption key with another encryption communication apparatus that delivers the encryption key to another user via a network, the apparatus comprising a processor configured to:
form n (n>1) systems of paths with respect to paths to the another encryption communication apparatus over the network;
generate n pieces of first data;
distribute the n pieces of first data to the n systems of paths, and transmit the n pieces of first data to the another encryption communication apparatus; and
generate the encryption key by superimposing the n pieces of first data,
wherein the n systems of paths are formed such that a same node is not redundantly applied to a plurality of paths among the n systems of paths.

12. The encryption communication apparatus of claim 11, wherein the processor is further configured to receive the n pieces of first data from the another encryption communication apparatus via the n systems of paths.

13. An encryption communication apparatus that delivers an encryption key to one user of two users who execute encryption communication, the encryption communication apparatus sharing the encryption key with another encryption communication apparatus that delivers the encryption key to another user via a network, the apparatus comprising a processor configured to:
form n (n>1) systems of paths with respect to paths with the another encryption communication apparatus over the network;
generate n pieces of first data;
distribute the n pieces of first data to the n systems of paths, and transmit the n pieces of first data to the another encryption communication apparatus; and
generate the encryption key based on second data obtained by restoration by a secret distribution method in which the n pieces of first data are regarded as distributed data,
wherein the n systems of paths are formed such that a same node is not redundantly applied to a plurality of paths among the n systems of paths.

14. The encryption communication apparatus of claim 13, wherein the processor is further configured to receive the n pieces of first data from the another encryption communication apparatus via the n systems of paths.

15. An encryption communication method of an encryption communication system that delivers an encryption key to a first user and a second user who execute encryption communication, the encryption communication system configuring a network with a plurality of nodes, and sharing the encryption key between a first node that delivers the encryption key to the first user and a second node that delivers the encryption key to the second user among the plurality of nodes, each of the plurality of nodes comprising a hardware component, the method comprising:

by the first node,
- forming n (n>1) systems of paths to the second node over the network,
- generating n pieces of first data,
- distributing the n pieces of first data to the n systems of paths and transmitting the n pieces of first data to the second node, and
- generating the encryption key by superimposing the n pieces of first data; and by the second node,
- receiving the n pieces of first data from the first node via the n systems of paths, and
- generating the encryption key by superimposing the n pieces of first data, wherein the n systems of paths are formed such that a same node is not redundantly applied to a plurality of paths among the n systems of paths.

16. An encryption communication method of an encryption communication system that delivers an encryption key to a first user and a second user who execute encryption communication, the encryption communication system configuring a network with a plurality of nodes, and sharing the encryption key between a first node that delivers the encryption key to the first user and a second node that delivers the encryption key to the second user among the plurality of nodes, each of the plurality of nodes comprising a hardware component, the method comprising:

by the first node,
- forming n (n>1) systems of paths to the second node over the network,
- generating n pieces of first data,
- distributing the n pieces of first data to the n-systems of paths and transmitting the n pieces of first data to the second node, and
- generating the encryption key based on second data obtained by restoration by a secret distribution method in which the n pieces of first data are regarded as distributed data; and by the second node,
- receiving the n pieces of first data from the first node via the n systems of paths, and
- generating the encryption key based on second data obtained by restoration by the secret distribution method in which the n pieces of first data are regarded as distributed data, wherein the n systems of paths are formed such that a same node is not redundantly applied to a plurality of paths among the n systems of paths.

* * * * *